United States Patent
Banerjea et al.

(10) Patent No.: US 9,860,823 B2
(45) Date of Patent: Jan. 2, 2018

(54) METHOD AND APPARATUS FOR REDUCING INTERFERENCE BETWEEN WIRELESS DEVICES OPERATING AT DIFFERENT DATA RATES IN A WIRELESS NETWORK

(71) Applicant: Marvell International LTD., Hamilton (BM)

(72) Inventors: Raja Banerjea, Sunnyvale, CA (US); Hongyuan Zhang, Fremont, CA (US)

(73) Assignee: Marvell International LTD., Hamilton (BM)

( * ) Notice: Subject to any disclaimer, the term of this patent is extended or adjusted under 35 U.S.C. 154(b) by 395 days.

(21) Appl. No.: 14/755,222

(22) Filed: Jun. 30, 2015

(65) Prior Publication Data

US 2015/0304938 A1 Oct. 22, 2015

Related U.S. Application Data

(63) Continuation of application No. 13/550,183, filed on Jul. 16, 2012, now Pat. No. 9,077,594.

(Continued)

(51) Int. Cl.
*H04W 48/06* (2009.01)
*H04W 72/04* (2009.01)
(Continued)

(52) U.S. Cl.
CPC ......... *H04W 48/06* (2013.01); *H04L 27/2602* (2013.01); *H04L 27/2613* (2013.01);
(Continued)

(58) Field of Classification Search
CPC .............................. H04W 48/06; H04W 72/04
See application file for complete search history.

(56) References Cited

U.S. PATENT DOCUMENTS 5,539,394 A 7/1996 Cato et al.
6,127,971 A 10/2000 Calderbank et al.
(Continued)

FOREIGN PATENT DOCUMENTS

CN 1890907 A 1/2007
CN 201045754 Y 4/2008
(Continued)

OTHER PUBLICATIONS

U.S. Appl. No. 12/730,651, filed Mar. 24, 2010, Zhang et al.
(Continued)

*Primary Examiner* — Jeffrey M Rutkowski
*Assistant Examiner* — Fangyan Deng

(57) ABSTRACT

An access point including a transceiver having first and second physical layers to communicate at first and second data rates, respectively. The transceiver receives a request from a first client station to reserve first or second subchannel of a channel for transmitting data at the first or second data rate. In response to receiving the request from the first client station, the transceiver transmits a response to allow the first client station to transmit data and prevent a second client station from transmitting data while the first client station transmits data to the access point. In response to the first client station receiving the response, the first physical layer receives data from the first client station without interference from the second client station.

22 Claims, 19 Drawing Sheets

Related U.S. Application Data

(60) Provisional application No. 61/595,821, filed on Feb. 7, 2012.

(51) Int. Cl.
*H04W 48/08* (2009.01)
*H04L 27/26* (2006.01)
*H04W 84/12* (2009.01)
*H04W 72/12* (2009.01)

(52) U.S. Cl.
CPC ....... *H04W 48/08* (2013.01); *H04W 72/0446* (2013.01); *H04L 27/2692* (2013.01); *H04W 72/1257* (2013.01); *H04W 72/1278* (2013.01); *H04W 84/12* (2013.01)

(56) References Cited

U.S. PATENT DOCUMENTS

| | | |
|---|---|---|
| 6,272,117 B1 | 8/2001 | Choi et al. |
| 6,594,251 B1 | 7/2003 | Raissinia et al. |
| 6,760,388 B2 | 7/2004 | Ketchum et al. |
| 7,209,765 B1 | 4/2007 | Hayase et al. |
| 7,289,481 B2 | 10/2007 | Wax et al. |
| 7,339,949 B2 | 3/2008 | Suzuki et al. |
| 7,372,830 B2 | 5/2008 | Jung et al. |
| 7,394,787 B2 | 7/2008 | Lee |
| 7,411,898 B2 | 8/2008 | Erlich et al. |
| 7,436,903 B2 | 10/2008 | Sandhu et al. |
| 7,493,134 B2 | 2/2009 | Shinozaki |
| 7,515,541 B2 | 4/2009 | Sandhu |
| 7,532,681 B2 | 5/2009 | Takeda et al. |
| 7,599,332 B2 | 10/2009 | Zelst et al. |
| 7,636,328 B2 | 12/2009 | Teague et al. |
| 7,742,390 B2 | 6/2010 | Mujtaba |
| 7,855,993 B2 | 12/2010 | Mujtaba |
| 7,873,049 B2 | 1/2011 | Gaur et al. |
| 8,009,578 B2 | 8/2011 | Kishigami et al. |
| 8,126,090 B1 | 2/2012 | Nabar |
| 8,144,647 B2 | 3/2012 | Nabar et al. |
| 8,149,811 B2 | 4/2012 | Nabar et al. |
| 8,155,138 B2 | 4/2012 | van Nee |
| 8,194,771 B2 | 6/2012 | Hammerschmidt et al. |
| 8,238,316 B2 | 8/2012 | Stacey |
| 8,289,869 B2 | 10/2012 | Sawai |
| 8,320,301 B2 | 11/2012 | Walton et al. |
| 8,331,419 B2 | 12/2012 | Zhang et al. |
| 8,339,978 B2 | 12/2012 | Sawai et al. |
| 8,411,807 B1 | 4/2013 | Rangarajan et al. |
| 8,437,440 B1 | 5/2013 | Zhang et al. |
| 8,462,643 B2 | 6/2013 | Walton et al. |
| 8,462,863 B1 | 6/2013 | Zhang et al. |
| 8,498,362 B2 | 7/2013 | Zhang et al. |
| 8,526,351 B2 | 9/2013 | Fischer et al. |
| 8,527,853 B2 | 9/2013 | Lakkis |
| 8,542,589 B2 | 9/2013 | Surineni et al. |
| 8,559,803 B2 | 10/2013 | Huang et al. |
| 8,588,144 B2 | 11/2013 | Nabar et al. |
| 8,599,803 B1 | 12/2013 | Zhang et al. |
| 8,599,804 B2 | 12/2013 | Erceg et al. |
| 8,619,907 B2 | 12/2013 | Mujtaba et al. |
| 8,718,191 B2 | 5/2014 | Lee et al. |
| 8,724,720 B2 | 5/2014 | Srinivasa et al. |
| 8,750,932 B2 | 6/2014 | Zeira et al. |
| 8,837,524 B2 | 9/2014 | Liu |
| 8,867,653 B2 | 10/2014 | Zhang et al. |
| 8,948,283 B2 | 2/2015 | Zhang |
| 8,958,436 B2 | 2/2015 | Nabar et al. |
| 8,982,889 B2 | 3/2015 | Zhang |
| 9,021,341 B1 | 4/2015 | Srinivasa et al. |
| 9,077,594 B2 | 7/2015 | Banerjea et al. |
| 9,088,466 B2 | 7/2015 | Banerjea |
| 9,124,402 B2 | 9/2015 | Nabar et al. |
| 9,294,249 B2 | 3/2016 | Nabar et al. |
| 9,596,715 B1 | 3/2017 | Zhang et al. |
| 9,713,065 B2 | 7/2017 | Banerjea et al. |
| 2001/0038619 A1 | 11/2001 | Baker et al. |
| 2002/0150058 A1 | 10/2002 | Kim et al. |
| 2002/0174172 A1 | 11/2002 | Hatalkar |
| 2003/0128658 A1 | 7/2003 | Walton et al. |
| 2004/0136465 A1 | 7/2004 | Hwang et al. |
| 2004/0146018 A1 | 7/2004 | Walton et al. |
| 2004/0203472 A1 | 10/2004 | Chien |
| 2004/0208253 A1 | 10/2004 | Joo |
| 2005/0013239 A1 | 1/2005 | Agrawal et al. |
| 2005/0015703 A1 | 1/2005 | Terry et al. |
| 2005/0068900 A1 | 3/2005 | Stephens et al. |
| 2005/0111451 A1 | 5/2005 | Kim |
| 2005/0136933 A1 | 6/2005 | Sandhu et al. |
| 2005/0195786 A1 | 9/2005 | Shpak |
| 2005/0195858 A1 | 9/2005 | Nishibayashi et al. |
| 2005/0233709 A1 | 10/2005 | Gardner et al. |
| 2005/0254457 A1 | 11/2005 | Jung et al. |
| 2005/0276347 A1 | 12/2005 | Mujtaba et al. |
| 2005/0281243 A1 | 12/2005 | Horn et al. |
| 2006/0007898 A1 | 1/2006 | Maltsev et al. |
| 2006/0009189 A1 | 1/2006 | Kim et al. |
| 2006/0045048 A1 | 3/2006 | Kwon et al. |
| 2006/0114865 A1 | 6/2006 | Hashimoto et al. |
| 2006/0114878 A1 | 6/2006 | Choe et al. |
| 2006/0120341 A1 | 6/2006 | Del Prado Pavon et al. |
| 2006/0176968 A1 | 8/2006 | Keaney et al. |
| 2006/0233271 A1 | 10/2006 | Savas et al. |
| 2006/0250938 A1 | 11/2006 | Khan et al. |
| 2006/0268671 A1 | 11/2006 | Coon |
| 2006/0280134 A1 | 12/2006 | Kwon et al. |
| 2006/0280155 A1 | 12/2006 | Kwon et al. |
| 2007/0047666 A1 | 3/2007 | Trachewsky |
| 2007/0049208 A1 | 3/2007 | Kim et al. |
| 2007/0060155 A1 | 3/2007 | Kahana et al. |
| 2007/0070927 A1 | 3/2007 | Shoki et al. |
| 2007/0081602 A1 | 4/2007 | Tanaka et al. |
| 2007/0086400 A1 | 4/2007 | Shida et al. |
| 2007/0121705 A1 | 5/2007 | French et al. |
| 2007/0153725 A1 | 7/2007 | Waxman |
| 2007/0211823 A1 | 9/2007 | Mazzarese et al. |
| 2007/0230338 A1 | 10/2007 | Shao et al. |
| 2007/0286122 A1 | 12/2007 | Fonseca |
| 2008/0049654 A1 | 2/2008 | Otal et al. |
| 2008/0118011 A1 | 5/2008 | Trachewsky et al. |
| 2008/0205317 A1 | 8/2008 | Piipponen et al. |
| 2008/0227475 A1 | 9/2008 | Suemitsu et al. |
| 2008/0253328 A1 | 10/2008 | Sahinoglu et al. |
| 2008/0298435 A1 | 12/2008 | Lakkis |
| 2008/0299962 A1 | 12/2008 | Kasher |
| 2009/0022093 A1 | 1/2009 | Nabar et al. |
| 2009/0022128 A1 | 1/2009 | Nabar et al. |
| 2009/0060094 A1 | 3/2009 | Jung et al. |
| 2009/0190547 A1 | 7/2009 | Shi et al. |
| 2009/0196163 A1 | 8/2009 | Du |
| 2009/0257476 A1 | 10/2009 | Watanabe |
| 2009/0285319 A1 | 11/2009 | Zhang et al. |
| 2010/0046358 A1 | 2/2010 | van Nee |
| 2010/0046656 A1 | 2/2010 | van Nee et al. |
| 2010/0074362 A1 | 3/2010 | Lim et al. |
| 2010/0098146 A1 | 4/2010 | Kim et al. |
| 2010/0120692 A1 | 5/2010 | Ford |
| 2010/0158164 A1 | 6/2010 | Oh et al. |
| 2010/0166087 A1 | 7/2010 | Lomnitz |
| 2010/0246543 A1 | 9/2010 | Rajkotia et al. |
| 2010/0260159 A1 | 10/2010 | Zhang et al. |
| 2010/0309958 A1 | 12/2010 | Lakkis |
| 2011/0002219 A1 | 1/2011 | Kim et al. |
| 2011/0002280 A1 | 1/2011 | Davydov et al. |
| 2011/0002319 A1 | 1/2011 | Husen et al. |
| 2011/0002430 A1 | 1/2011 | Kim et al. |
| 2011/0013616 A1 | 1/2011 | Fischer et al. |
| 2011/0051705 A1 | 3/2011 | Jones, IV et al. |
| 2011/0069790 A1 | 3/2011 | Okehie |
| 2011/0096796 A1 | 4/2011 | Zhang et al. |
| 2011/0134899 A1 | 6/2011 | Jones, IV et al. |
| 2011/0142020 A1 | 6/2011 | Kang et al. |
| 2011/0299382 A1 | 12/2011 | Van Nee et al. |
| 2011/0305178 A1 | 12/2011 | Zheng et al. |

(56) References Cited

U.S. PATENT DOCUMENTS

| | | |
|---|---|---|
| 2011/0305296 A1 | 12/2011 | Van Nee |
| 2012/0039406 A1 | 2/2012 | Srinivasa et al. |
| 2012/0195391 A1 | 8/2012 | Zhang et al. |
| 2012/0201316 A1 | 8/2012 | Zhang et al. |
| 2012/0224570 A1 | 9/2012 | Seok et al. |
| 2012/0294294 A1 | 11/2012 | Zhang |
| 2012/0300874 A1 | 11/2012 | Zhang |
| 2012/0302272 A1 | 11/2012 | Hakola et al. |
| 2012/0314583 A1 | 12/2012 | Hart et al. |
| 2012/0320889 A1 | 12/2012 | Zhang et al. |
| 2013/0016642 A1 | 1/2013 | Banerjea et al. |
| 2013/0016737 A1 | 1/2013 | Banerjea |
| 2013/0051260 A1 | 2/2013 | Liu |
| 2013/0177096 A1 | 7/2013 | Park et al. |
| 2013/0199851 A1 | 8/2013 | Koch et al. |
| 2013/0202001 A1 | 8/2013 | Zhang |
| 2013/0235908 A1 | 9/2013 | Zhang et al. |
| 2013/0243115 A1 | 9/2013 | Taghavi Nasrabadi et al. |
| 2013/0287043 A1 | 10/2013 | Nanda et al. |
| 2014/0071973 A1 | 3/2014 | Nabar et al. |
| 2015/0003276 A1 | 1/2015 | Liu |
| 2015/0136933 A1 | 5/2015 | Merzon |
| 2015/0155998 A1 | 6/2015 | Nabar et al. |
| 2015/0189639 A1 | 7/2015 | Zhang |
| 2015/0304938 A1 | 10/2015 | Banerjea et al. |

FOREIGN PATENT DOCUMENTS

| | | |
|---|---|---|
| CN | 101263690 A | 9/2008 |
| CN | 101960899 A | 1/2011 |
| EP | 1087630 A1 | 3/2001 |
| EP | 1286491 A1 | 2/2003 |
| EP | 1357693 A1 | 10/2003 |
| EP | 1545025 A1 | 6/2005 |
| EP | 1598975 A2 | 11/2005 |
| EP | 1679803 A2 | 7/2006 |
| JP | 64-021059 | 1/1989 |
| JP | 62176235 | 1/1989 |
| JP | 06268575 | 9/1994 |
| JP | H11-275056 A | 10/1999 |
| JP | 2003179581 A | 6/2003 |
| JP | 2005102136 A | 4/2005 |
| JP | 2005509360 A | 4/2005 |
| JP | 2005512447 A | 4/2005 |
| JP | 2005514859 A | 5/2005 |
| JP | 2005236686 A | 9/2005 |
| JP | 2005528002 A | 9/2005 |
| JP | 2006504335 A | 2/2006 |
| JP | 2006197586 A | 7/2006 |
| JP | 2006520109 A | 8/2006 |
| JP | 2006254235 A | 9/2006 |
| JP | 2006295736 A | 10/2006 |
| JP | 2006319959 A | 11/2006 |
| JP | 2006333236 A | 12/2006 |
| JP | 2007096744 A | 4/2007 |
| JP | 2007110317 A | 4/2007 |
| JP | 2007110456 A | 4/2007 |
| JP | 2007124376 A | 5/2007 |
| JP | 2007520161 A | 7/2007 |
| JP | 2010200122 A | 9/2010 |
| WO | WO-2003005652 A1 | 1/2003 |
| WO | WO-03041300 A1 | 5/2003 |
| WO | WO-200358881 A2 | 7/2003 |
| WO | WO-2004084436 A1 | 9/2004 |
| WO | WO-2005067212 A1 | 7/2005 |
| WO | WO-2005079012 A1 | 8/2005 |
| WO | WO-2006000988 A1 | 1/2006 |
| WO | WO-2006020520 A2 | 2/2006 |
| WO | WO-2006048037 A1 | 5/2006 |
| WO | WO-2006051771 A1 | 5/2006 |
| WO | WO-2006054252 A1 | 5/2006 |
| WO | WO-2006132506 A1 | 12/2006 |
| WO | WO-2007043108 A1 | 4/2007 |
| WO | WO-2007052150 A1 | 5/2007 |
| WO | WO-2007073040 A1 | 6/2007 |
| WO | WO-2009012448 A2 | 1/2009 |
| WO | WO-2009059229 A1 | 5/2009 |
| WO | WO-2009114612 A1 | 9/2009 |
| WO | WO-2010005775 A1 | 1/2010 |
| WO | WO-2010095793 A1 | 8/2010 |
| WO | WO-2010095802 A1 | 8/2010 |
| WO | WO-2010120692 A1 | 10/2010 |
| WO | WO-2011006108 A2 | 1/2011 |
| WO | WO-2011031058 A2 | 3/2011 |
| WO | WO-2011031454 A1 | 3/2011 |
| WO | WO-2011049314 A2 | 4/2011 |
| WO | WO-2011120692 A2 | 10/2011 |
| WO | WO-2012122119 A1 | 9/2012 |

OTHER PUBLICATIONS

U.S. Appl. No. 13/159,143, filed Jun. 13, 2011, Srinivasa et al.
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancement for Higher Throughput," the Institute of Electrical and Electronics Engineers, Inc., Sep. 2007; 544 pages.
"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancement for Higher Throughput," the Institute of Electrical and Electronics Engineers, Inc., Oct. 29, 2009; 535 pages.
The International Search Report and Written Opinion of the International Searching Authority for corresponding International Application No. PCT/US2011/043134, dated Nov. 2, 2011, 10 Pages.
Alcatel-Lucent et al, Dedicated Reference Signals for MU-MIMO Precoding in E-UTRA Downlink, 3GPP R1-071069, Feb. 16, 2007; 3 Pages.
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 Pages.
Chang, Yuang; Wang, Junyi; Zhu, Houtao; Kashima, Tsuyoshi; Araki, Kiyomichi; Integrated User Scheduling Algorithm for Multi-User MIMO-Downlink System; IEICE Technical report; Jun. 21, 2007, vol. 107, No. 113, pp. 91-96; RCS2007-26.
de Vegt, Rolf, IEEE 802.11-11/0457r0, Potential Compromise for 802.11ah Use Case Document, Mar. 17, 2011, 27 pages.
First Office Action from Chinese Patent Office for Chinese Patent Application No. 200800250809; Translated; 7 Pages.
Freescale Semiconductor Inc., Downlink reference signaling for MU-MIMO, 3GPP R1-071509, Mar. 17, 2007; 4 Pages.
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Haene et al., "A Real-Tim 4-Stream MIMO-OFDM Transceiver: System Design, FPGA Implementation, and Characterization," IEEE Journal on Selected Areas in Communications, vol. 26, No. 6 ( Aug. 2008); 13 Pages.
Harada, "Project: IEEE P802.15 Working Group for Wireless Personal Area Network (WPANs)," IEEE 802.15-07-0693-003c (May 2007).
Huaning Niu et al., "Advanced Wireless Communication Systems and Techniques", Jul. 6, 2009, U.S. Appl. No. 61/223,360, 93 Pages.
IEEE 802.11-11/042lrl, D1.0 PHY Comments Discussion, Mar. 15, 2011, 14 pages.
IEEE 802.11-11/1483rl, 11ah Preamble for 2MHz and Beyond, Nov. 7, 2011, 17 pages.
IEEE 802.11ah; IEEE 802.11-11/0035r0; Heejung Yu, Il-gy Lee, Minho Cheng, Hun Sik Kang, Sok-kuy Lee; Dated Jan. 12, 2011; 10 Pages.

(56) References Cited

OTHER PUBLICATIONS

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.
IEEE 802.20-PD-06; IEEE p. 802.20™ V14; Jul. 16, 2004; Draft 802.20 Permanent Document; System Requirements for IEEE 802.20 Mobile Broadband Wireless Access. Systems-Version 14; 24 pages.
IEEE P802.11, Wireless LANs, Mar. 2012, 2793 pages.
IEEE P802.11-09/0992r11—Specification Framework for Tgac, [Online] May 18, 2010, retrieved from the Internet: https://mentor.ieee.org/802.11/dcn/09/11-09-0992-11-00ac-proposed-specifiction-framework-for-tgac.doc, pp. 1-10.
IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.
IEEE P802.11ac/00.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Mar. 2011, 184 pages.
IEEE P802.11nTM, IEEE Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 5 Enhancements for Higher Throughput; "*The Institute of Electrical and Electronics Engineers, Inc.*" Oct. 2009.
IEEE P802.11nTM/D3.00, Draft Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 4 Enhancements for Higher Throughput; "*The Institute of Electrical and Electronics Engineers, Inc.*" Sep. 2007.
IEEE Std 802.11-2007 (Revision of IEEE Std. 802.11-1999) Information Standard for Information Technology—Telecommunications and information exchange between systems—Local and metropolitan area networks—Specific requirements—Part 11: Wireless LAN Medium Access Control (MAC) and Physical Layer (PHY) specifications, "The Institution of Electrical and Electronics Engineers, Inc.," Jun. 12, 2007; 1232 Pages.
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999); 91 Pages.
IEEE Std 802.11ac/D2.0 Draft Standard for Information Technology—Telecommunications and information exchange between systems—Local and metropolitan area networks—Specific requirements—Part 11: Wireless LAN Medium Access Control (MAC) and Physical Layer (PHY) specification: Amendment 4: Enhancements for Very High Throughput for Operation in Bands below 6 GHz, the Institution of Electrical and Electronics Engineers, Inc., Jan. 2012; 359 Pages.
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operations," the Institute of Electrical and Electronics Engineers, Inc., Nov. 2011; 123 Pages.
IEEE Std 802.11b-1999 (Supplement to IEEE Std 802.11-1999 Edition); Supplement to IEEE Standard for Information technology—Telecommunications and information exchange between systems—Local and Metropolitan area networks—Specific requirements—Part 11: Wireless LAN Medium Access control (MAC) and Physical Layer (PHY) specifications: Higher-Speed Physical Layer Extension in the 2.4 GHz Band: LAN/MAN Standards Committee of the IEEE Computer Society; Sep. 16, 1999 IEEE-SA Standards Board; 96 pages.
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc. Nov. 7, 2001; 23 pages.
IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band, "The Institution of Electrical and Electronics Engineers, Inc.," May 2002; 53 Pages.
IEEE Std 802.11h™—2003 [Amendment to IEEE Std 802.11™, 1999 Edition (Reaff 2003) as amended by IEEE Stds 802.11a™-1999, 802.11b™-1999, 802.11b™-1999/Cor Jan. 2001, 802,11 d™-2001, 802.11g™-2003]; IEEE Standard for Information Technology—Telecommunications and information exchange between systems—Local and metropolitan area networks—Specific requirements: Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 Pages.
IEEE Std 802.11™-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Mar. 29, 2012, 2793 pages.
IEEE Std 802.16/2004 (Revision of IEEE Std 802.16/2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.
IEEE Std 802.16TM—2001; IEEE Standard for Local and metropolitan area networks, Part 16: Air Interface for Fixed Broadband Wireless Access Systems; LAN/MAN Standards Committee, IEEE Computer Society and IEEE Microwave Theory and Techniques Society; Apr. 8, 2002; 349 Pages.
IEEE Std P802.11-REVma/06.0, "Unapproved Draft Standard for Information Technology—Telecommunications and information exchange between systems—Local and metropolitan area networks—Specific requirements—Part 11: Wireless LAN Medium Access Control (MAC) and Physical Layer (PHY) specification. (This document reflects the combining of the 2003 of the 2003 Edition of 802.11 plus the 802.11g, 802.11h 802.11i and 802.11j Amendments) (Revision of IEEE Std 802.11-1999)(Superseded by P802.11-REVma_D7.0)," 2006; 1212 Pages.
IEEE Std P802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003; 69 Pages.

(56) References Cited

OTHER PUBLICATIONS

IEEE Std. P802.11ad/D5.0 "'Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," the Institute of Electrical and Electronics Engineers, Inc., Sep. 2011.
Imashioya et al., "RTL Design of 1.2 Gbps MIMO WLAN System and its Business Aspect," IEEE 9th Int'l Symposium on Communications and Information Technology (ISCIT 2009), the Institute of Electrical and Electronics Engineers 2009; pp. 296-301.
International Preliminary Report on Patentability in corresponding PCT/US2012/022768 dated Jul. 30, 2013.
International Search Report and Written Opinion for International Application No. PCT/US2012/022768, dated Jul. 5, 2012; 17 Pages.
International Search Report and Written Opinion of the International Searching Authority, dated Jul. 19, 2012; in reference to PCT/US/2012/036917, filed Aug. 5, 2012; 15 pages.
Invitation to Pay Additional Fees and Partial International Search Report for International Application No. PCT/US2012/022769, dated Apr. 26, 2012; 8 Pages.
Invitation to Pay Additional Fees and, where Applicable, Protest Fee dated Jan. 21, 2009 in reference to PCT/US2008/070469; 25 Pages.
Japanese Office Action dated Apr. 17, 2013; 6 Pages.
Japanese Office Action dated Nov. 28, 2013 for Japanese Application No. 2012-165994; 2 Pages.
Japanese Office Action for related Japanese Application No. 2013-171165 dated Feb. 17, 2015; 2 pages.
Japanese Rejection for Japanese Patent Application No. 2014-511395 dated Dec. 16, 2014; 4 pages.
Notice of Reason for Rejection from Japanese Patent Office for Japanese Patent Application No. 2010-517185; Translation from RYUKA IP Law Firm; 3 Pages.
Notification of Transmittal of the International Search Report and the Written Opinion of the International Searching Authority dated Oct. 17, 2012; International Application No. PCT/US2012/046929, International Filing Date Jul. 16, 2012; 4 Pages.
Notification of Transmittal of the International Search Report and the Written Opinion of the International Searching Authority dated Oct. 17, 2012; International Application No. PCT/US2012/046929, International Filing Date Jul. 16, 2012; 7 pages.
Notification of Transmittal of the International Search Report and the Written Opinion of the International Searching Authority for PCT/US2012/046908, International Filing Date Jul. 16, 2012; 13 pages.
Notification of Transmittal of the International Search Report and the Written Opinion of the International Searching Authority, or the Declaration dated Dec. 23, 2008 in reference to PCT/US2008/070466; 14 pages.
Office Action for U.S. Appl. No. 13/477,920 dated Jan. 28, 2014.
Park, "Proposed Specification Framework for Tgah", the Institute of Electrical and Electronics Engineers, doc. No. IEEE 802.11-11/1137r6, Mar. 2012.
Perahai, et al., "Gigabit Wireless LANs: an overview of IEEE 802.11ac and 802.11ad," ACM Sigmobile Mobile Computing and Communications Review, vo. 15, No. 3, Jul. 2011; pp. 23-33.
Ritt et al.; "Eigen-mode Close-Loop Transmission for E-UTRA MIMO"; 3GPP R1-060421; Feb. 17, 2006; 9 pages.
S. A. Mujaba, "IEEE P802.11-04/0889r6 Wireless LANs TGn Synce Proposal Technical Specification" May 2005; 134 Pages.
S. A. Mujaba, "IEEE P802.11a-1999 (Supplement to IEEE Std 802.11-1999)" Supplement to IEEE Standard for Information technology—Telecommunications and information exchange between systems—Local and metropolitan area networks—Specific requirements—Part 11: Wireless LAN Medium Access Control (MAC) and Physical Layer (PHY) Specifications; High-Speed Physical Layer in the 5 GHz Band, "*The Institute of Electrical and Electronics Engineer, Inc.*" (1999).
S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005; 131 Pages.
Second Office Action in corresponding European Patent Application No. 08 782 054.4 dated Feb. 3, 2011.
Shi et al., "Phase Tracking During VHT-LTF," doc. No. IEEE 802.11-10/0771r0, the Institute of Electrical and Electronics Engineers, Jul. 2010; 19 Pages.
Specification of the Bluetooth System—Specification vol. 0; Master Table of Contents & Compliance Requirements; Covered Core Package version: 2.0+EDR; Current Master TOC issued: Nov. 4, 2004; Part A, pp. 1-74; vol. 1, pp. 1-92; vol. 2 & 3, pp. 1-814; vol. 4, pp. 1-250.
Stacey et al., "IEEE P802.11, Wireless LANs Proposed Tgac Draft Amendment," the Institution of Electrical and Electronics Engineers, Inc., doc. No. IEEE 802.11-10/1361r3; Jan. 2011; 154 Pages.
Stacey et al., "Specification Framework for Tgac," document No. IEEE 802.11-09-0992r20, the Institution of Electrical and Electronics Engineers, Inc., Jan. 18, 2011 pp. 1-49.
Syafei et al., "A Design of Next Generation Gigabit MIMO Wireless LAN System," IEEE 12th Int'l Conference on Advanced Communication Technology (ICACT 2010), the Institute of Electrical and Electronics Engineers 2010; pp. 941-946.
Syafei et al., "A Gigabit MIMO WLAN System with International Standardization Strategy," IEEE Int'l Symposium on Intelligent Signal Processing and Communication Systems (ISPACS 2009), the Institute of Electrical and Electronics Engineers, Dec. 7, 2009; pp. 228-231.
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), the Institute of Electrical and Electronics Engineers, 2009; pp. 207-211.
Taghavi et al., "Introductory Submission for Tgah", doc No. IEEE 802.11-11/0062r0, Institute for Electrical and Electronics Engineers, pp. 1-5 (Jan. 14, 2011); 6 Pages.
The International Search Report and the Written Opinion of the International Searching Authority, or the Declaration dated Mar. 11, 2003 for International Application No. PCT/US2008/070469 filed Jul. 18, 2008; 15 Pages.
Van Nee et al., "The 802.11n MIMO-OFDM Standard for Wireless LAN and Beyond," Wireless Personal Communications, vol. 37 pp. 445-453 (2006).
van Zelst et al., "Pilot Sequence for VHT-DATA," doc. No. IEEE 802.11-10/0811r1, the Institute of Electrical and Electronics Engineers, Jul. 2010; 10 Pages.
Vermani et al., "Spec Framework Text for Phy Numerology," the Institute of Electrical and Electronics Engineers, doc. No. IEEE 802.11-11/1311r0, Sep. 2011; 5 Pages.
Vermani, et al., "Preamble Format for 1 MHz," the Institute of Electrical and Electronics Engineers, doc. No. IEEE 802.11-11/1482r2, (Nov. 2011); 30 Pages.
Yu, et al., "Coverage extension for IEEE 802.11ah," the Institute of Electrical and Electronics Engineers, doc. No. IEEE 802.11-11/0035r1, (Nov. 2011); 10 Pages.
Zhang et al., "11ah Data Transmission Flow," the Institute of Electrical and Electronics Engineers, doc. No. IEEE 802.11-11/1484r1, (Nov. 2011); 15 Pages.
Chen, "Home Network Basis: Transmission Environments and Wired/Wireless Protocols," Prentice Hall, pp. 1-26 (Jul. 2003).
Hiertz et al., "The IEEE 802.11 Universe," IEEE Communications Magazine, pp. 62-70 (Jan. 2010).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," the Institute of Electrical and Electronics Engineers, Inc., pp. 1-363 (Mar. 2012).
IEEE Std 802.11ac/D3.0 "Draft Standard for Information Technology—Telecommunications and information exchange between sys-

(56) References Cited

OTHER PUBLICATIONS tems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," the Institute of Electrical and Electronics Engineers, Inc., pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," the Institute of Electrical and Electronics Engineers, Inc., pp. 1-408 (Oct. 2012).
Lee et al., "TGaf PHY proposal," the Institute of Electrical and Electronics Engineers, doc. No. IEEE 802.11-12/0809r5, pp. 1-43 (Jul. 10, 2012).
Notice of Allowance in U.S. Appl. No. 13/689,244, dated May 15, 2015 (12 pages).
Office Action for U.S. Appl. No. 13/689,244, dated Feb. 23, 2015.
Office Action for U.S. Appl. No. 13/689,244, dated Jul. 17, 2014.
Office Action in U.S. Appl. No. 13/689,183, dated Aug. 1, 2014.
Office Action in U.S. Appl. No. 13/689,183, dated Feb. 4, 2015.
Office Action in U.S. Appl. No. 13/689,183, dated Jun. 29, 2015.
Office Action in U.S. Appl. No. 13/689,223, dated Apr. 9, 2014.
Office Action in U.S. Appl. No. 13/689,223, dated Mar. 17, 2015.
Office Action in U.S. Appl. No. 13/689,223, dated Sep. 11, 2014.
Park, "Proposed Specification Framework for Tgah D9.x", the Institute of Electrical and Electronics Engineers, doc. No. IEEE 802.11-1yy/xxxxr0, Jul. 2012.
Park, "Proposed Specification Framework for Tgah", the Institute of Electrical and Electronics Engineers, doc. No. IEEE 802.11-11/1137r11, Sep. 2012.
Park, "Proposed Specification Framework for Tgah", the Institute of Electrical and Electronics Engineers, doc. No. IEEE 802.11-1yy/xxxxr05, Jan. 2012.
U.S. Appl. No. 13/689,183, al., "(WLAN) Packets with Midambles," filed Nov. 29, 2012.
U.S. Appl. No. 13/689,223, Zhang, et al., "Long Wireless Local Area Network (WLAN) Packets with Midambles," filed Nov. 29, 2012.
U.S. Appl. No. 13/689,244, Zhang, et al., "Long Wireless Local Area Network (WLAN) Packets with Midambles," filed Nov. 29, 2012.
Zhang et al., "1 MHz Waveform in Wider BW ", the Institute of Electrical and Electronics Engineers, doc. No. IEEE 802.11-12/0309r1, pp. 1-10 (Mar. 2012).
Zhang et al., "Beamforming Feedback for Single Stream," the Institute of Electrical and Electronics Engineers, doc. No. IEEE 802.11-12/1312r0, pp. 1-22 (Nov. 12, 2012).
Examiner's Report to the Board dated Feb. 4, 2016 for related Japanese Application No. 2013-171165; 2 pages.
First Office Action in Chinese Application No. 201280014281.5, dated Jul. 3, 2015, no English translation provided (12 pages).
Office Action in Japanese Application No. 2013-551344, dated Sep. 15, 2015, with English translation (5 Pages).
Office Action in U.S. Appl. No. 13/689,223 dated Aug. 12, 2015 (13 Pages).
Search Report for Chinese Application No. 2012800240095 dated Nov. 12, 2015; 2 pages.
Shao, "Channel Selection for 802.11ah," doc.: IEEE 802.11-12/0816r0, pp. 1-11 (Jul. 2012).
Japanese Office Action for JP2014-528392 dated Mar. 23, 2016.
English Translation of Office Action for Japanese Application No. 2013-171165 dated Apr. 26, 2016; 5 pages.
Chinese Search Report for Chinese Application No. 2012800347533 dated Nov. 3, 2016.
Chinese Search Report for Chinese Application No. 2012800421847 dated Dec. 15, 2016.
Communication pursuant to Article 94(3) EPC in European Patent Application No. 12703655.6, dated Aug. 8, 2016 (8 pages).
Notice of Allowance in U.S. Appl. No. 13/477,920, dated Jun. 6, 2014 (7 pages).
Notice of Allowance in U.S. Appl. No. 13/477,920, dated Sep. 18, 2014 (7 pages).
Second Office Action in Chinese Application No. 201280014281.5, dated Mar. 8, 2015, with English translation (6 pages).
Supplemental Notice of Allowability in U.S. Appl. No. 13/477,920, dated Jul. 15, 2014 (4 pages).
Christian Hoymann, et al.; "Evaluation of Grouping Strategies for and Hierarchical SDMA/TDMA Scheduling Process"; 2007 IEEE International Conference on Communications; Jun. 28, 2007; pp. 5616-5621.
Notice of Allowance in U.S. Appl. No. 13/689 244, dated Aug. 21, 2015 (7 pages).
Notice of Allowance in U.S. Appl. No. 13/689,244, dated Jan. 13, 2016 (7 pages).
Office Action in U.S. Appl. No. 13/689,183, dated Mar. 3, 2016 (28 pages).
Office Action in U.S. Appl. No. 13/689,223, dated Mar. 31, 2016 (14 pages).
Organized translation of Notice of Reasons for Rejection for Japanese Application No. 2015-218535 dated Aug. 9, 2016; 2 pages.
Shinji Murai, et al.; "Wireless Resource Allocation Methods Based on QoS in MIMO-SDMA/TDMA Systems"; the Institute of Electronics, Information and Communication Engineers (IEICE) Technical Report; vol. 106, No. 168; RCS2006-65; Jul. 12, 2006; pp. 37-42.
Aikawa, 802.11 High-Speed Wireless LAN Textbook, IMPRESS R&D, Apr. 11, 2008, pp. 260-265 and 276-279; No translation provided.
Japanese Office Action for JP2014-520406 dated Mar. 15, 2016.
English Translation of Office Action for Japanese Application No. 2013-171165 dated Jul. 7, 2015; 3 pages.

| | Use Case (Indoor/Outdoor) | TX Range | Data Rate | Link Budget | Low Power | Mobile |
|---|---|---|---|---|---|---|
| 1a | Smart Grid | <1km | <100 Kbps | High | N | N |
| 1c | Environment/Agriculture Monitoring | <1km | <100 Kbps | High | Y | N |
| 1d | Industrial Process Control | <2km | <1 Mbps | High | N | N |
| 1e | Indoor Healthcare | In building | <100 Kbps | Normal | Y | N |
| 1f | Healthcare/Fitness | In building | <100 Kbps | Normal | Y | N |
| 1g | Home/Building Automation Control | In building | <100 Kbps | Normal | N | N |
| 1h | Temp. Sensor Network | In building | <10 Kbps | Normal | Y | N |
| 2a | Backhaul for 15.4g (ZigBee) | <1km | <1 Mbps | High | N | N |
| 2b | Backhaul for Industrial Process Automation | <1km | <1 Mbps | High | N | N |
| 3a | Extended Range Hotspot | <1km | <10 Mbps | High | N | Y |
| 3b | Outdoor WiFi for Cellular offloading | <1km | <20 Mbps | High | N | Y |

FIG. 1

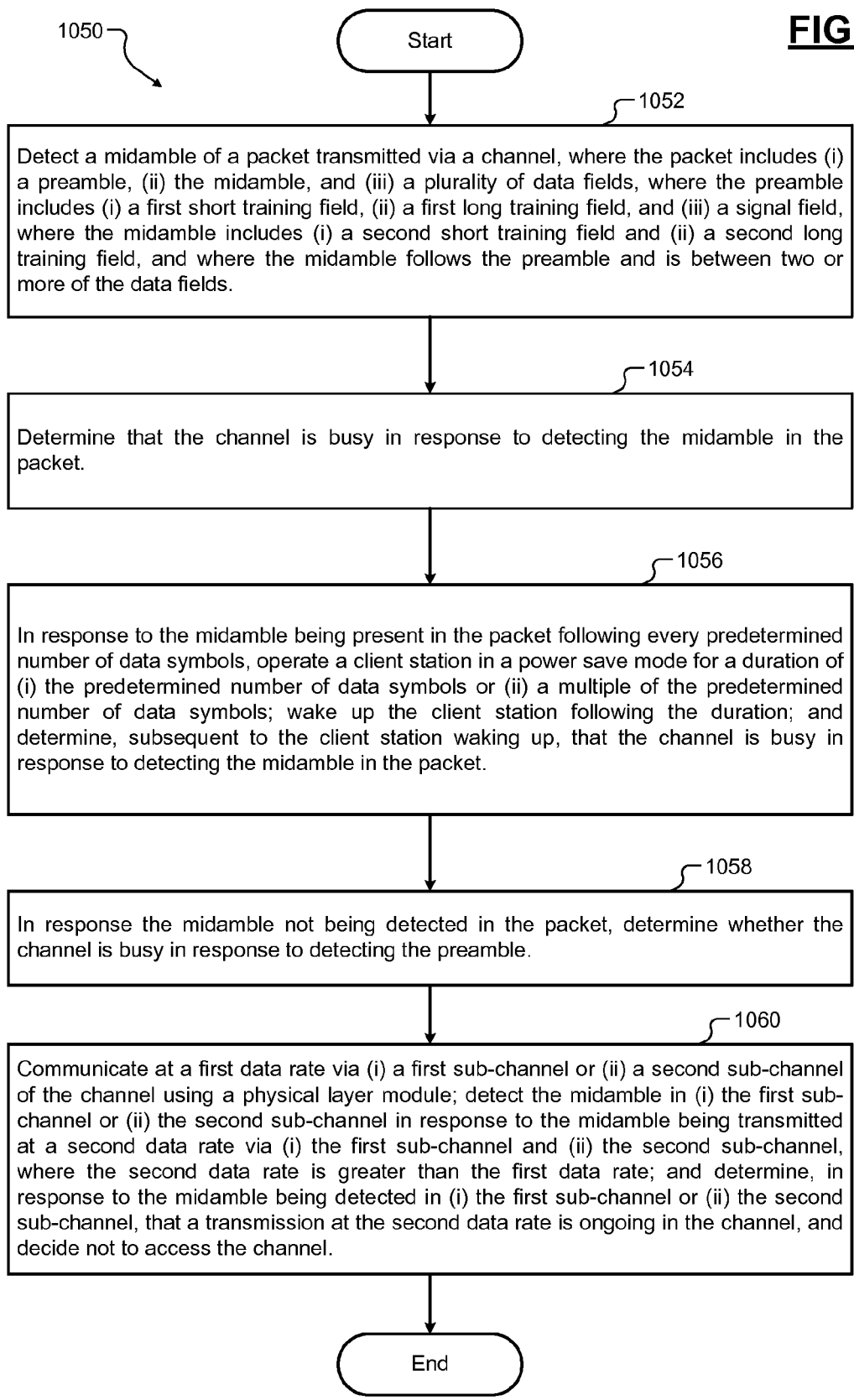

METHOD AND APPARATUS FOR REDUCING INTERFERENCE BETWEEN WIRELESS DEVICES OPERATING AT DIFFERENT DATA RATES IN A WIRELESS NETWORK

CROSS-REFERENCE TO RELATED APPLICATIONS

This application is a continuation of U.S. patent application Ser. No. 13/550,183 (now U.S. Pat. No. 9,077,594), filed on Jul. 16, 2012, which claims the benefit of U.S. Provisional Application No. 61/595,821 filed on Feb. 7, 2012.

This application is related to U.S. Provisional Application No. 61/508,474 filed on Jul. 15, 2011 and U.S. Provisional Application No. 61/528,660 filed on Aug. 29, 2011. This application is also related to U.S. patent application Ser. No. 12/841,772 filed on Jul. 22, 2010, which claims the benefit of U.S. Provisional Application No. 61/228,084 filed on Jul. 23, 2009. This application is also related to U.S. Provisional Application No. 61/486,713, filed on May 16, 2011.

The disclosures of the applications referenced above are incorporated herein by reference in their entirety.

FIELD

The present disclosure relates generally to wireless communication systems and more particularly to coexistence of a normal-rate physical layer and a low-rate physical layer in a wireless network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Institute of Electrical and Electronics Engineers (IEEE) has developed standards for wireless local area networks (WLANs). Some of the standards, generally denoted as 802.1x, specify operating parameters including frequency bands, modulation and coding schemes, data rates, and packet formats for WLANs.

To provide high data rates, most WLANs operate in high-frequency bands. For example, WLANs compliant with 802.11a/b/g/n/ac/ad standards operate in 2.4 GHz, 5 GHz, or 60 GHz frequency bands and provide data rates ranging from 11 Mbps to more than 1 Gbps. The range of these WLANs is relatively short, however, due to high frequency of operation.

The range of WLANs can be extended by lowering operating frequencies. When the operating frequencies are lowered, however, the data rates also have to be lowered due to low bandwidth of operation. For example, WLANs compliant with 802.11ah and 802.11af standards operate in a sub-1 GHz frequency band and have longer range but lower data rates than WLANs compliant with 802.11a/b/g/n/ac/ad standards since they operate with bandwidth of 1 or 2 MHz.

SUMMARY

A system comprises a first preamble generation module, a second preamble generation module, and a packet generation module. The first preamble generation module is configured to generate a first preamble. The first preamble includes a first training field to train receivers operating at a first data rate. The second preamble generation module is configured to generate a second preamble. The second preamble includes a second training field to train receivers operating at a second data rate. The second data rate is different than the first data rate. The packet generation module is configured to generate a packet. The packet includes the second preamble followed by the first preamble in response to the packet being transmitted at the first data rate, or the first preamble followed by the second preamble in response to the packet being transmitted at the second data rate.

In other features, the system further comprises a physical layer module configured to transmit the packet at the first data rate in response to the packet including the second preamble followed by the first preamble.

In other features, the system further comprises a physical layer module configured to transmit the packet at the second data rate in response to the packet including the first preamble followed by the second preamble.

In other features, the system further comprises a first physical layer module configured to transmit the packet at the first data rate in response to the packet including the second preamble followed by the first preamble, and a second physical layer module configured to transmit the packet at the second data rate in response to the packet including the first preamble followed by the second preamble.

In still other features, a receiver comprises a physical layer module and a processing module. The physical layer module is configured to receive a packet via a medium. The packet includes a first preamble followed by a second preamble. The first preamble is generated based on a first data rate. The second preamble is generated based on a second data rate. At least one of the first preamble and the second preamble includes a duration of the packet. The processing module is configured to process (i) the first preamble in response to the receiver operating at the first data rate or (ii) the second preamble in response to the receiver operating at the second data rate, and determine whether to defer accessing the medium for the duration of the packet based on the processing of the first preamble or the second preamble.

In other features, the first preamble includes (i) a first training field to train receivers operating at the first data rate and (ii) a first signal field to indicate the duration of the packet, and the processing module is configured to process the first preamble in response to the receiver (i) operating at the first data rate and (ii) training on the first training field, and determine the duration of the packet based on the first signal field. The processing module is configured to (i) detect an identifier in the first signal field and (ii) decide not to access the medium for the duration of the packet in response to the identifier indicating that the packet is not indented for the receiver.

In other features, the second preamble includes (i) a second training field to train receivers operating at the second data rate and (ii) a second signal field to indicate the duration of the packet, and the processing module is configured to process the second preamble in response to the receiver (i) operating at the second data rate and (ii) training on the second training field, and determine the duration of the packet based on the second signal field. The processing module is configured to (i) detect an identifier in the second signal field and (ii) decide not to access the medium for the duration of the packet in response to the identifier indicating that the packet is not indented for the receiver.

In other features, in response to the packet including data generated at the second rate and the receiver being configured to operate at the second rate, the processing module is configured to process the first preamble, determine whether the packet includes data generated at the second rate based on the processing of the first preamble, process the second preamble in response to determining that the packet includes data generated at the second rate, and determine the duration of the packet based on the processing of the second preamble. The processing module is configured to (i) detect an identifier in the second preamble and (ii) decide not to access the medium for the duration of the packet in response to the identifier indicating that the packet is not indented for the receiver.

In other features, in response to the packet including data generated at the first rate and the receiver being configured to operate at the first rate and the second rate, the processing module is configured to process the first preamble, determine whether the packet includes data generated at the second rate based on the processing of the first preamble, process the second preamble in response to determining that the packet includes data generated at the second rate, and determine the duration of the packet based on the processing of the second preamble. The processing module is configured to (i) detect an identifier in the second preamble and (ii) decide not to access the medium for the duration of the packet in response to the identifier indicating that the packet is not indented for the receiver.

In still other features, a method comprises generating a first preamble, wherein the first preamble includes a first training field to train receivers operating at a first data rate; and generating a second preamble, where the second preamble includes a second training field to train receivers operating at a second data rate, and the second data rate is different than the first data rate. The method further comprises generating a packet, where the packet includes the second preamble followed by the first preamble in response to the packet being transmitted at the first data rate, or the first preamble followed by the second preamble in response to the packet being transmitted at the second data rate.

In other features, the method further comprises transmitting the packet at the first data rate in response to the packet including the second preamble followed by the first preamble.

In other features, the method further comprises transmitting the packet at the second data rate in response to the packet including the first preamble followed by the second preamble.

In other features, the method further comprises transmitting the packet at the first data rate in response to the packet including the second preamble followed by the first preamble, and transmitting the packet at the second data rate in response to the packet including the first preamble followed by the second preamble.

In still other features, a method comprises receiving a packet at a receiver via a medium, where the packet includes a first preamble followed by a second preamble, the first preamble is generated based on a first data rate, the second preamble is generated based on a second data rate, and at least one of the first preamble and the second preamble includes a duration of the packet. The method further comprises processing (i) the first preamble in response to the receiver operating at the first data rate or (ii) the second preamble in response to the receiver operating at the second data rate, and determining whether to defer accessing the medium for the duration of the packet based on the processing of the first preamble or the second preamble.

In other features, the first preamble includes (i) a first training field to train receivers operating at the first data rate and (ii) a first signal field to indicate the duration of the packet, and the method further comprises processing the first preamble in response to the receiver (i) operating at the first data rate and (ii) training on the first training field, and determining the duration of the packet based on the first signal field. The method further comprises detecting an identifier in the first signal field, and deciding not to access the medium for the duration of the packet in response to the identifier indicating that the packet is not indented for the receiver.

In other features, the second preamble includes (i) a second training field to train receivers operating at the second data rate and (ii) a second signal field to indicate the duration of the packet, and the method further comprises processing the second preamble in response to the receiver (i) operating at the second data rate and (ii) training on the second training field, and determining the duration of the packet based on the second signal field. The method further comprises detecting an identifier in the second signal field, and deciding not to access the medium for the duration of the packet in response to the identifier indicating that the packet is not indented for the receiver.

In other features, the method further comprises, in response to the packet including data generated at the second rate and the receiver being configured to operate at the second rate, processing the first preamble, determining whether the packet includes data generated at the second rate based on the processing of the first preamble, processing the second preamble in response to determining that the packet includes data generated at the second rate, and determining the duration of the packet based on the processing of the second preamble. The method further comprises detecting an identifier in the second preamble, and deciding not to access the medium for the duration of the packet in response to the identifier indicating that the packet is not indented for the receiver.

In other features, the method further comprises, in response to the packet including data generated at the first rate and the receiver being configured to operate at the first rate and the second rate, processing the first preamble, determining whether the packet includes data generated at the second rate based on the processing of the first preamble, processing the second preamble in response to determining that the packet includes data generated at the second rate, and determining the duration of the packet based on the processing of the second preamble. The method further comprises detecting an identifier in the second preamble, and deciding not to access the medium for the duration of the packet in response to the identifier indicating that the packet is not indented for the receiver.

In still other features, an access point comprises a first physical layer module and a second physical layer module. The first physical layer module is configured to communicate at a first data rate via a first sub-channel and a second sub-channel of a channel. The second physical layer module is configured to communicate at a second data rate via (i) the first sub-channel or (ii) the second sub-channel, where the first data rate is greater than the second data rate. The first physical layer module is configured to receive, from a first client station, a request to reserve the channel for transmitting data from the first client station to the access point at the first data rate, where the request is not received by a second client station configured to transmit data to the access point via the first sub-channel or the second sub-channel at the second rate. In response to the first physical layer module receiving the request from the first client station, the access point is configured to transmit a response to (i) allow the first client station to transmit data at the first data rate via the channel, and (ii) prevent the second client station from transmitting data via the first sub-channel or the second sub-channel at the second rate while the first client station transmits data at the first data rate to the access point via the channel.

In other features, the request includes a ready-to-send frame, where the response includes a clear-to-send frame, and where the first physical layer module and the second physical layer module send the clear-to-send frame.

In other features, the first physical layer module transmits the response prior to the second physical layer module transmitting the response, and the second physical layer module transmits the response subsequent to the first physical layer module transmitting the response; or the second physical layer module transmits the response prior to the first physical layer module transmitting the response, and the first physical layer module transmits the response subsequent to the second physical layer module transmitting the response.

In other features, the response includes a hybrid packet, where the hybrid packet includes (i) a first preamble generated at the first data rate, (ii) a second preamble generated at the second data rate, and (iii) a payload generated at the second data rate, and where the first preamble includes a duration for which the channel is reserved for the first client station to transmit data to the access point.

In other features, the response includes a hybrid packet, where the hybrid packet includes (i) a first preamble generated at the second data rate, (ii) a second preamble generated at the first data rate, and (iii) a payload generated at the first data rate, and where the first preamble includes a duration for which the channel is reserved for the first client station to transmit data to the access point.

In other features, the response includes a first packet followed by a gap and a second packet, where the first packet is generated at the first data rate, where the second packet is generated at the second data rate, where the second packet includes (i) no payload and (ii) a preamble, and where the preamble includes a duration for which the channel is reserved for the first client station to transmit data to the access point.

In other features, the response includes a first packet followed by a gap and a second packet, where the first packet is generated at the second data rate, where the second packet is generated at the first data rate, where the second packet includes (i) no payload and (ii) a preamble, and where the preamble includes a duration for which the channel is reserved for the first client station to transmit data to the access point.

In other features, in response to the first client station receiving the response, the first physical layer module is configured to receive data from the first client station without interference from the second client station.

In still other features, an access point comprises a first physical layer module and a second physical layer module. The first physical layer module is configured to communicate at a first data rate via a first sub-channel and a second sub-channel of a channel. The second physical layer module is configured to communicate at a second data rate via (i) the first sub-channel or (ii) the second sub-channel, where the first data rate is greater than the second data rate. The second physical layer module is configured to receive, from a first client station, a request to reserve the first sub-channel or the second sub-channel for transmitting data from the first client station to the access point at the second data rate, where the request is not processed by a second client station configured to transmit data to the access point via the channel at the first rate. In response to the second physical layer module receiving the request from the first client station, the access point is configured to transmit a response to (i) allow the first client station to transmit data at the second data rate via the first sub-channel or the second sub-channel, and (ii) prevent the second client station from transmitting data at the first data rate via the channel while the first client station transmits data at the second data rate to the access point via the first sub-channel or the second sub-channel.

In other features, the request includes a ready-to-send frame, where the response includes a clear-to-send frame, and where the first physical layer module and the second physical layer module send the clear-to-send frame.

In other features, the first physical layer module transmits the response prior to the second physical layer module transmitting the response, and the second physical layer module transmits the response subsequent to the first physical layer module transmitting the response; or the second physical layer module transmits the response prior to the first physical layer module transmitting the response, and the first physical layer module transmits the response subsequent to the second physical layer module transmitting the response.

In other features, the response includes a hybrid packet, where the hybrid packet includes (i) a first preamble generated at the first data rate, (ii) a second preamble generated at the second data rate, and (iii) a payload generated at the second data rate, and where the first preamble includes a duration for which the channel is reserved for the first client station to transmit data to the access point.

In other features, the response includes a hybrid packet, where the hybrid packet includes (i) a first preamble generated at the second data rate, (ii) a second preamble generated at the first data rate, and (iii) a payload generated at the first data rate, and where the first preamble includes a duration for which the channel is reserved for the first client station to transmit data to the access point.

In other features, the response includes a first packet followed by a gap and a second packet, where the first packet is generated at the first data rate, where the second packet is generated at the second data rate, where the second packet includes (i) no payload and (ii) a preamble, and where the preamble includes a duration for which the channel is reserved for the first client station to transmit data to the access point.

In other features, the response includes a first packet followed by a gap and a second packet, where the first packet is generated at the second data rate, where the second packet is generated at the first data rate, where the second packet includes (i) no payload and (ii) a preamble, and where the preamble includes a duration for which the channel is reserved for the first client station to transmit data to the access point.

In other features, in response to the first client station receiving the response, the second physical layer module is configured to receive data from the first client station without interference from the second client station.

In still other features, a first client station comprises a first physical layer module and a second physical layer module. The first physical layer module is configured to communicate at a first data rate via a first sub-channel and a second sub-channel of a channel. The second physical layer module is configured to communicate at a second data rate via (i) the first sub-channel or (ii) the second sub-channel, where the first data rate is greater than the second data rate. The first client station is configured to communicate with an access point associated with a second client station capable of communicating at the first data rate. The first client station is configured to transmit (i) a request to the access point to reserve the channel for transmitting data at the first data rate or to reserve the first sub-channel or the second sub-channel for transmitting data at the second data rate and (ii) data to the access point without interference from the second client station, using one of the following: (i) the second physical layer module only, (ii) the first physical layer module and the second physical layer module, (iii) transmission of a first packet followed by a gap and a second packet, where the first packet is generated at the first data rate and includes no payload, and where the second packet is generated at the second data rate and includes payload, or (iv) transmission of the second packet followed by the gap and the first packet.

In other features, a system comprises the first client station and the access point. The access point is configured to transmit a response to (i) allow the first client station to transmit data using the first physical layer module via the channel or using the second physical layer module via the first sub-channel or the second sub-channel and (ii) prevent the second client station from transmitting data via the channel while the first client station transmits data to the access point.

In other features, the access point comprises a third physical layer module and a fourth physical layer module. The third physical layer module is configured to communicate at the first data rate via the first sub-channel and the second sub-channel. The fourth physical layer module is configured to communicate at the second data rate via (i) the first sub-channel or (ii) the second sub-channel. The access point transmits the response using one of the following: (i) the fourth physical layer module only, (ii) the third physical layer module and the fourth physical layer module, (iii) transmission of a third packet followed by the gap and a fourth packet, where the third packet is generated at the first data rate and includes no payload and a preamble, where the preamble includes a duration for which the channel is reserved for the first client station to transmit data to the access point, and where the fourth packet is generated at the second data rate and includes payload, or (iv) transmission of the fourth packet followed by the gap and the third packet.

In still other features, a method comprises communicating at a first data rate via a first sub-channel and a second sub-channel of a channel using a first physical layer module of an access point and communicating at a second data rate via (i) the first sub-channel or (ii) the second sub-channel using a second physical layer module of the access point, where the first data rate is greater than the second data rate. The method further comprises receiving at the first physical layer module, from a first client station, a request to reserve the channel for transmitting data from the first client station to the access point at the first data rate, where the request is not received by a second client station configured to transmit data to the access point via the first sub-channel or the second sub-channel at the second rate. The method further comprises, in response to the first physical layer module receiving the request from the first client station, transmitting a response from the access point to (i) allow the first client station to transmit data at the first data rate via the channel, and (ii) prevent the second client station from transmitting data via the first sub-channel or the second sub-channel at the second rate while the first client station transmits data at the first data rate to the access point via the channel.

In other features, the request includes a ready-to-send frame, where the response includes a clear-to-send frame, and where the first physical layer module and the second physical layer module send the clear-to-send frame.

In other features, the method further comprises transmitting the response from the first physical layer module prior to the second physical layer module transmitting the response, and transmitting the response from the second physical layer module subsequent to the first physical layer module transmitting the response; or transmitting the response from the second physical layer module prior to the first physical layer module transmitting the response, and transmitting the response from the first physical layer module subsequent to the second physical layer module transmitting the response.

In other features, the response includes a hybrid packet, where the hybrid packet includes (i) a first preamble generated at the first data rate, (ii) a second preamble generated at the second data rate, and (iii) a payload generated at the second data rate, and where the first preamble includes a duration for which the channel is reserved for the first client station to transmit data to the access point.

In other features, the response includes a hybrid packet, where the hybrid packet includes (i) a first preamble generated at the second data rate, (ii) a second preamble generated at the first data rate, and (iii) a payload generated at the first data rate, and where the first preamble includes a duration for which the channel is reserved for the first client station to transmit data to the access point.

In other features, the response includes a first packet followed by a gap and a second packet, where the first packet is generated at the first data rate, where the second packet is generated at the second data rate, where the second packet includes (i) no payload and (ii) a preamble, and where the preamble includes a duration for which the channel is reserved for the first client station to transmit data to the access point.

In other features, the response includes a first packet followed by a gap and a second packet, where the first packet is generated at the second data rate, where the second packet is generated at the first data rate, where the second packet includes (i) no payload and (ii) a preamble, and where the preamble includes a duration for which the channel is reserved for the first client station to transmit data to the access point.

In other features, the method further comprises, in response to the first client station receiving the response, receiving data at the first physical layer module from the first client station without interference from the second client station.

In still other features, a method comprises communicating at a first data rate via a first sub-channel and a second sub-channel of a channel using a first physical layer module of an access point; and communicating at a second data rate via (i) the first sub-channel or (ii) the second sub-channel using a second physical layer module of the access point, where the first data rate is greater than the second data rate. The method further comprises receiving at the second physical layer module, from a first client station, a request to reserve the first sub-channel or the second sub-channel for transmitting data from the first client station to the access point at the second data rate, where the request is not processed by a second client station configured to transmit data to the access point via the channel at the first rate. The method further comprises, in response to the second physical layer module receiving the request from the first client station, transmitting a response from the access point to (i) allow the first client station to transmit data at the second data rate via the first sub-channel or the second sub-channel, and (ii) prevent the second client station from transmitting data at the first data rate via the channel while the first client station transmits data at the second data rate to the access point via the first sub-channel or the second sub-channel.

In other features, the request includes a ready-to-send frame, where the response includes a clear-to-send frame, and where the first physical layer module and the second physical layer module send the clear-to-send frame.

In other features, the method further comprises transmitting the response from the first physical layer module prior to the second physical layer module transmitting the response, and transmitting the response from the second physical layer module subsequent to the first physical layer module transmitting the response; or transmitting the response from the second physical layer module prior to the first physical layer module transmitting the response, and transmitting the response from the first physical layer module subsequent to the second physical layer module transmitting the response.

In other features, the response includes a hybrid packet, where the hybrid packet includes (i) a first preamble generated at the first data rate, (ii) a second preamble generated at the second data rate, and (iii) a payload generated at the second data rate, and where the first preamble includes a duration for which the channel is reserved for the first client station to transmit data to the access point.

In other features, the response includes a hybrid packet, where the hybrid packet includes (i) a first preamble generated at the second data rate, (ii) a second preamble generated at the first data rate, and (iii) a payload generated at the first data rate, and where the first preamble includes a duration for which the channel is reserved for the first client station to transmit data to the access point.

In other features, the response includes a first packet followed by a gap and a second packet, where the first packet is generated at the first data rate, where the second packet is generated at the second data rate, where the second packet includes (i) no payload and (ii) a preamble, and where the preamble includes a duration for which the channel is reserved for the first client station to transmit data to the access point.

In other features, the response includes a first packet followed by a gap and a second packet, where the first packet is generated at the second data rate, where the second packet is generated at the first data rate, where the second packet includes (i) no payload and (ii) a preamble, and where the preamble includes a duration for which the channel is reserved for the first client station to transmit data to the access point.

In other features, the method further comprises, in response to the first client station receiving the response, receiving data at the second physical layer module from the first client station without interference from the second client station.

In still other features, a method comprises communicating at a first data rate via a first sub-channel and a second sub-channel of a channel using a first physical layer module of a first client station; and communicating at a second data rate via (i) the first sub-channel or (ii) the second sub-channel using a second physical layer module of the first client station, where the first data rate is greater than the second data rate, and where the first client station is configured to communicate with an access point associated with a second client station capable of communicating at the first data rate. The method further comprises transmitting from the first client station (i) a request to the access point to reserve the channel for transmitting data at the first data rate or to reserve the first sub-channel or the second sub-channel for transmitting data at the second data rate and (ii) data to the access point without interference from the second client station, using one of the following: (i) the second physical layer module only, (ii) the first physical layer module and the second physical layer module, (iii) transmission of a first packet followed by a gap and a second packet, where the first packet is generated at the first data rate and includes no payload, and where the second packet is generated at the second data rate and includes payload, or (iv) transmission of the second packet followed by the gap and the first packet.

In other features, the method further comprises transmitting from the access point a response to (i) allow the first client station to transmit data using the first physical layer module via the channel or using the second physical layer module via the first sub-channel or the second sub-channel and (ii) prevent the second client station from transmitting data via the channel while the first client station transmits data to the access point.

In other features, the method further comprises communicating at the first data rate via the first sub-channel and the second sub-channel using a third physical layer module of the access point; and communicating at the second data rate via (i) the first sub-channel or (ii) the second sub-channel using a fourth physical layer module of the access point. The method further comprises transmitting the response from the access point using one of the following: (i) the fourth physical layer module only, (ii) the third physical layer module and the fourth physical layer module, (iii) transmission of a third packet followed by the gap and a fourth packet, where the third packet is generated at the first data rate and includes no payload and a preamble, where the preamble includes a duration for which the channel is reserved for the first client station to transmit data to the access point, and where the fourth packet is generated at the second data rate and includes payload, or (iv) transmission of the fourth packet followed by the gap and the third packet.

In still other features, a system comprises a physical layer module and a processing module. The physical layer module is configured to communicate at a first data rate via a channel, where the channel includes (i) a first sub-channel and (ii) a second sub-channel of the channel, receive a first packet including a first preamble transmitted at the first data rate via (i) the first sub-channel and (ii) the second sub-channel, and receive a second packet including a second preamble transmitted at a second data rate via (i) the first sub-channel or (ii) the second sub-channel, where the second data rate is less than the first data rate. The processing module is configured to process (i) the first preamble transmitted at the first data rate and (ii) at least a portion of the second preamble transmitted at the second data rate.

In other features, the processing module is configured to determine that the channel is busy in response to detecting at least the portion of the second preamble transmitted via (i) the first sub-channel or (ii) the second sub-channel.

In other features, the system further comprises an energy detection module configured to detect an energy level in the channel and determine that the channel is busy in response to the energy level being greater than or equal to a predetermined threshold.

In other features, the first preamble includes (i) a first short training field having a first periodicity and (ii) a first remainder, the second preamble includes (i) a second short training field having a second periodicity and (ii) a second remainder, the second periodicity is equal to the first periodicity divided by an integer greater than or equal to one, and the first remainder is different than the second remainder.

In other features, each of the first short training field and the second short training field activates the processing module to process (i) the first preamble transmitted at the first data rate and (ii) at least the portion of the second preamble transmitted at the second data rate.

In other features, the second remainder includes a signal field, and the processing module is configured to process the signal field, determine a duration of the second packet based on processing the signal field, and defer accessing the channel for the duration.

In other features, the second remainder includes (i) a long training field and (ii) a first signal field, and the processing module is configured to process (i) the second short training field and (ii) the long training field. In response to the processing module being unable to process the first signal field, the processing module is configured to defer accessing the channel until the processing module detects a second signal field of the first preamble, the processing module detects a frame sequence to set a network allocation vector, or expiration of a predetermined period corresponding to a duration of (i) the second packet or (ii) a single transmission sequence.

In other features, the processing module is configured to defer accessing the channel for a first predetermined period, access the channel at an end of the first predetermined period, and subsequent to gaining access to the channel at the end of the first predetermined period, access the channel for a second predetermined period. The first predetermined period and the second predetermined period are based on a predetermined duty cycle assigned to a device transmitting the second packet. The device accesses the channel during the first predetermined period and does not access the channel during the second predetermined period.

In other features, the system further comprises an energy detection module configured to detect an energy level of the second packet, where the processing module is configured to defer accessing the channel in response to the energy level being greater than or equal to a predetermined threshold.

In other features, the system further comprises an energy detection module configured to detect an energy level of the second packet, where the processing module is configured to defer accessing the channel in response to the energy level being (i) greater than or equal to a predetermined energy detection threshold and (ii) less than or equal to a preamble detection threshold.

In other features, the processing module is configured to defer accessing the channel for a predetermined period unless, prior to expiration of the predetermined period, the processing module detects (i) duration of the first packet or the second packet respectively from a signal field of the first preamble or the second preamble or (ii) network allocation vector duration.

In other features, the second preamble includes a short training field and is transmitted by a device configured to transmit (i) the first preamble via the channel at the first data rate and (ii) the second preamble via the first sub-channel or the second sub-channel at the second data rate, and a length of the short training field is increased in response to a transmission from the device at the second rate failing a plurality of times. The system further comprises an energy detection module configured to detect an energy level of the second packet, where the processing module is configured to defer accessing the channel in response to detecting the short training field having an increased length, or defer accessing the channel in response to (i) the energy level being greater than or equal to a predetermined threshold and (ii) the short training field having the increased length not being detected.

In other features, the system further comprises an energy detection module configured to detect an energy level of the second packet, where the processing module is configured to defer accessing the channel in response to (i) the energy level being greater than or equal to a predetermined threshold and (ii) the second preamble being not detected. Subsequent to gaining access to the channel based on the energy level, the processing module is further configured to (i) access the channel for a first predetermined period, (ii) stop accessing the channel after expiration of the first predetermined period, and (iii) not access the channel for a second predetermined period following the expiration of the first predetermined period, where the first predetermined period and the second predetermined period are based on a predetermined duty cycle.

In still other features, a method comprises communicating at a first data rate via a channel using a physical layer module, where the channel includes (i) a first sub-channel and (ii) a second sub-channel of the channel. The method further comprises receiving, using the physical layer module, a first packet including a first preamble transmitted at the first data rate via (i) the first sub-channel and (ii) the second sub-channel. The method further comprises receiving, using the physical layer module, a second packet including a second preamble transmitted at a second data rate via (i) the first sub-channel or (ii) the second sub-channel, where the second data rate is less than the first data rate. The method further comprises processing (i) the first preamble transmitted at the first data rate and (ii) at least a portion of the second preamble transmitted at the second data rate.

In other features, the method further comprises determining that the channel is busy in response to detecting at least the portion of the second preamble transmitted via (i) the first sub-channel or (ii) the second sub-channel.

In other features, the method further comprises detecting an energy level in the channel and determining that the channel is busy in response to the energy level being greater than or equal to a predetermined threshold.

In other features, the first preamble includes (i) a first short training field having a first periodicity and (ii) a first remainder, the second preamble includes (i) a second short training field having a second periodicity and (ii) a second remainder, the second periodicity is equal to the first periodicity divided by an integer greater than or equal to one, and the first remainder is different than the second remainder.

In other features, each of the first short training field and the second short training field activates the processing of (i) the first preamble transmitted at the first data rate and (ii) at least a portion of the second preamble transmitted at the second data rate.

In other features, the second remainder includes a signal field, and the method further comprises processing the signal field; determining a duration of the second packet based on processing the signal field; and deferring accessing the channel for the duration.

In other features, the second remainder includes (i) a long training field and (ii) a first signal field, and the method further comprises processing (i) the second short training field and (ii) the long training field. The method further comprises, in response to inability to process the first signal field, deferring accessing the channel until detecting a second signal field of the first preamble, detecting a frame sequence to set a network allocation vector, or expiration of a predetermined period corresponding to a duration of (i) the second packet or (ii) a single transmission sequence.

In other features, the method further comprises deferring accessing the channel for a first predetermined period; accessing the channel at an end of the first predetermined period; and subsequent to gaining access to the channel at the end of the first predetermined period, accessing the channel for a second predetermined period. The first predetermined period and the second predetermined period are based on a predetermined duty cycle assigned to a device transmitting the second packet. The device accesses the channel during the first predetermined period and does not access the channel during the second predetermined period.

In other features, the method further comprises detecting an energy level of the second packet; and deferring accessing the channel in response to the energy level being greater than or equal to a predetermined threshold.

In other features, the method further comprises detecting an energy level of the second packet; and deferring accessing the channel in response to the energy level being (i) greater than or equal to a predetermined energy detection threshold and (ii) less than or equal to a preamble detection threshold.

In other features, the method further comprises deferring accessing the channel for a predetermined period unless, prior to expiration of the predetermined period, (i) duration of the first packet or the second packet is detected respectively from a signal field of the first preamble or the second preamble or (ii) network allocation vector duration is detected.

In other features, the second preamble includes a short training field and is transmitted by a device configured to transmit (i) the first preamble via the channel at the first data rate and (ii) the second preamble via the first sub-channel or the second sub-channel at the second data rate, and a length of the short training field is increased in response to a transmission from the device at the second rate failing a plurality of times. The method further comprises detecting an energy level of the second packet; and deferring accessing the channel in response to detecting the short training field having an increased length, or (i) the energy level being greater than or equal to a predetermined threshold and (ii) the short training field having the increased length not being detected.

In other features, the method further comprises detecting an energy level of the second packet and deferring accessing the channel in response to (i) the energy level being greater than or equal to a predetermined threshold and (ii) the second preamble being not detected. The method further comprises, subsequent to gaining access to the channel based on the energy level, (i) accessing the channel for a first predetermined period, (ii) stopping accessing the channel after expiration of the first predetermined period, and (iii) not accessing the channel for a second predetermined period following the expiration of the first predetermined period, where the first predetermined period and the second predetermined period are based on a predetermined duty cycle.

In still other features, a client station comprises a midamble detection module and a processing module. The midamble detection module is configured to detect a midamble of a packet transmitted via a channel, where the packet includes (i) a preamble, (ii) the midamble, and (iii) a plurality of data fields, where the preamble includes (i) a first short training field, (ii) a first long training field, and (iii) a signal field, where the midamble includes (i) a second short training field and (ii) a second long training field, and where the midamble follows the preamble and is between two or more of the data fields. The processing module is configured to determine that the channel is busy in response to detecting the midamble in the packet.

In other features, in response to the midamble being present in the packet following every predetermined number of data symbols, the client station further comprises a power save module configured to operate the client station in a power save mode for a duration of (i) the predetermined number of data symbols or (ii) a multiple of the predetermined number of data symbols, and to wake up the client station following the duration, where the processing module is configured to determine, subsequent to the client station waking up, that the channel is busy in response to detecting the midamble in the packet.

In other features, in response the midamble not being detected in the packet, the processing module is configured to determine whether the channel is busy in response to detecting the preamble.

In other features, the client station further comprises a physical layer module configured to communicate at a first data rate via (i) a first sub-channel or (ii) a second sub-channel of the channel, where the midamble detection module is configured to detect the midamble in (i) the first sub-channel or (ii) the second sub-channel in response to the midamble being transmitted at a second data rate via (i) the first sub-channel and (ii) the second sub-channel, where the second data rate is greater than the first data rate. The processing module is configured to determine, in response to the midamble being detected in (i) the first sub-channel or (ii) the second sub-channel, that a transmission at the second data rate is ongoing in the channel, and to decide not to access the channel.

In still other features, a method comprises detecting a midamble of a packet transmitted via a channel, where the packet includes (i) a preamble, (ii) the midamble, and (iii) a plurality of data fields, where the preamble includes (i) a first short training field, (ii) a first long training field, and (iii) a signal field, where the midamble includes (i) a second short training field and (ii) a second long training field, and where the midamble follows the preamble and is between two or more of the data fields. The method further comprises determining that the channel is busy in response to detecting the midamble in the packet.

In other features, in response to the midamble being present in the packet following every predetermined number of data symbols, the method further comprises operating a client station in a power save mode for a duration of (i) the predetermined number of data symbols or (ii) a multiple of the predetermined number of data symbols; waking up the client station following the duration; and determining, subsequent to the client station waking up, that the channel is busy in response to detecting the midamble in the packet.

In other features, the method further comprises, in response the midamble not being detected in the packet, determining whether the channel is busy in response to detecting the preamble.

In other features, the method further comprises communicating at a first data rate via (i) a first sub-channel or (ii) a second sub-channel of the channel using a physical layer module; detecting the midamble in (i) the first sub-channel or (ii) the second sub-channel in response to the midamble being transmitted at a second data rate via (i) the first sub-channel and (ii) the second sub-channel, where the second data rate is greater than the first data rate; and determining, in response to the midamble being detected in (i) the first sub-channel or (ii) the second sub-channel, that a transmission at the second data rate is ongoing in the channel, and deciding not to access the channel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 1 is a table depicting examples of use cases including indoor and outdoor networks;

FIG. 18 is a flowchart of a method for coexistence of a normal-rate physical layer and a low-rate physical layer in a wireless network using midambles according to the present disclosure.

DESCRIPTION

Figure 2A:
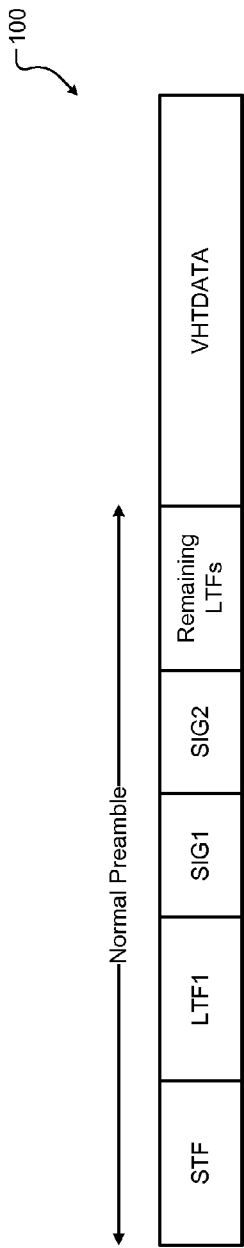
FIG. 2A depicts an example of a packet including a normal-rate preamble.

A physical layer (PHY) device operating at a normal data rate specified by 802.11ah and 802.11af standards is called a normal-rate PHY. A low-rate PHY operates at a data rate lower than the normal data rate and can be used, for example, in long-range WiFi and sensor networks. For example, the low-rate PHY can be used in devices that are compliant with 802.11ah and 802.11af standards and that operate in a sub-1 GHz frequency band. Examples of use cases discussed below indicate that both normal-rate and low-rate PHYs can coexist. That is, a device can include both a normal-rate PHY and a low-rate PHY. Alternatively, a device including only the normal-rate PHY and a device including only the low-rate PHY can coexist in a network.

The present disclosure relates to preamble designs that allow a normal-rate PHY and a low-rate PHY to coexist. Specifically, the preamble designs allow the normal-rate and low-rate PHYs to automatically detect the preambles and to defer (i.e., back off) when the detected preamble is not intended for the detecting device. Accordingly, the preamble designs can minimize interference due to coexistence.

FIG. 1 illustrates examples of use cases including an indoor network and an outdoor network. Use cases 1a through 1h include networks comprising sensors and meters. Use cases 2a, 2b include networks comprising backhaul sensor and meter data. Use cases 3a, 3b include extended range WiFi networks. The networks used in these use cases may be deployed in indoor and/or outdoor environments.

For each network, FIG. 1 shows a transmit range, a data rate, a link budget, a power level, and whether the network includes mobile devices. The link budget indicates robustness of preamble. For example, a high link budget indicates a need for a robust preamble. A low-rate preamble is more robust than a normal-rate preamble since low-rate transmissions can travel longer distances than normal data rate transmissions (hence the robustness). Accordingly, a high link budget indicates a need for a low-rate preamble, which in turn requires using a low-rate PHY that transmits data at a lower than a normal data rate. A normal link budget indicates a need for a normal-rate preamble, which in turn requires using a normal-rate PHY that transmits data at a normal data rate according to the specification. The low-rate and normal-rate PHYs and preambles are discussed below in detail.

The link budget and the data rate requirements of a use case determine whether the devices in the network can use a low-rate PHY and a low-rate preamble or use a normal-rate PHY and a normal-rate preamble. For example, devices in the networks of use cases 1f and 1h may use low-rate PHY; devices in the networks of use cases 1g and 3a could use normal-rate PHY; devices in the networks of use cases 1a and 1d may use low-rate PHY; devices in the networks of use cases 3a and 3b could use normal-rate PHY; and so on. Accordingly, both low-rate and normal-rate PHYs can coexist in the indoor and outdoor environment.

An access point (AP) may communicate with devices (stations or STAs) in the networks servicing a plurality of use cases. The AP may transmit and receive data to and from one set of devices using a low-rate PHY and may transmit and receive data to and from another set of devices using a normal-rate PHY. Without preamble detection and deferral, the STAs could interfere with each other's transmissions. The STAs should defer based on preamble detection to minimize interference and to achieve good coexistence. Accordingly, the STAs should support both normal-rate and low-rate preamble formats.

Figure 2B:
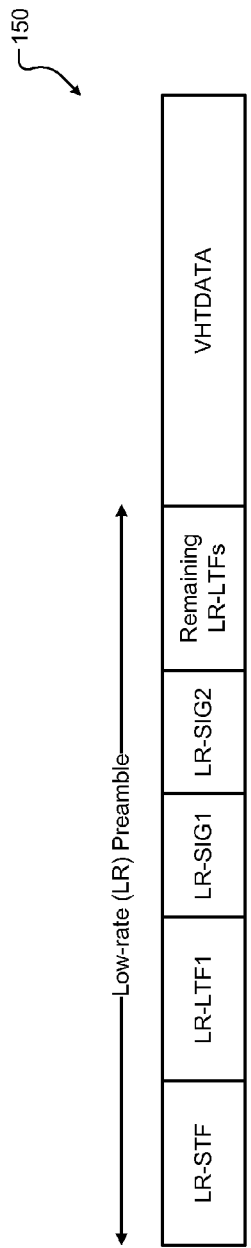
FIG. 2B depicts an example of a packet including a low-rate preamble.

Referring now to FIGS. 2A and 2B, examples of packets including normal-rate and low-rate preambles are shown. In FIG. 2A, an example of a packet 100 including a normal-rate preamble is shown. The packet 100 carries data at a normal data rate specified by the standard and can be called a normal-rate packet. For example only, the normal-rate preamble shown is a Greenfield mode preamble, which does not include a Legacy portion for backward compatibility with Legacy devices. The normal-rate preamble includes a short training field (STF), a long training field (LTF1), signal fields SIG1 and SIG2 (collectively SIG fields), and remaining LTFs for other data streams (e.g., multiple-input multiple-output or MIMO streams). The normal-rate preamble is followed by very high throughput (VHT) data.

A receiver receiving the packet 100 uses the STF of the normal-rate preamble for packet detection, coarse frequency synchronization, and for setting a gain of an automatic gain control (AGC) of the receiver to process the packet 100. The LTFs (e.g., LTF1 and the remaining LTFs) are used for channel estimation and fine frequency synchronization. The SIG fields (e.g., SIG1 and SIG2) are used to indicate to the receiver a set of PHY parameters such as a modulation and coding scheme (MCS) used to modulate the data in the packet 100. Accordingly, the receiver can process the data in the packet 100 based on the normal-rate preamble.

In FIG. 2B, an example of a packet 150 including a low-rate preamble is shown. The packet 150 carries data at a lower rate that the normal rate specified by the standard and can be called a low-rate packet. For example only, the low-rate preamble shown is also a Greenfield mode preamble. The low-rate preamble includes fields having different signatures than the normal-rate preamble. The low-rate preamble includes a low-rate short training field (LR-STF), a low-rate long training field (LR-LTF1), low-rate signal fields LR-SIG1 and LR-SIG2 (collectively LR-SIG fields), and remaining low-rate LTFs (LR-LTFs) for other data streams. The low-rate preamble is followed by VHT data. A receiver receiving the packet 150 uses the fields of the low-rate preamble to process the packet 150 in a manner similar to that described above with reference to packet 100.

Figure 3:
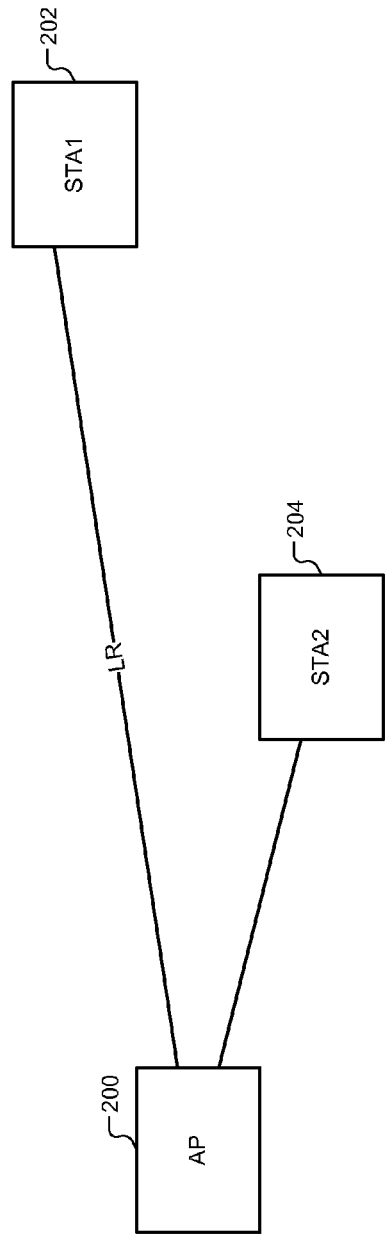
FIG. 3 is a functional block diagram of a network including an access point and a plurality of client stations.

Referring now to FIG. 3, an access point (AP) 200 may communicate with stations STA1 202 and STA2 204. Station STA1 202 may be farther from the AP 200 than the station STA2 204. Accordingly, the AP 200 may transmit to the station STA1 202 using a low-rate PHY, and the AP 200 may transmit to the station STA2 204 using a normal-rate PHY. In each packet, one of the SIG fields in the normal-rate and low-rate preambles includes a length/duration field that indicates a length and/or duration of the packet. If a station determines that a packet is not intended for the station, the station does not access the medium (i.e., defers) for the duration indicated in the length/duration field.

Typically, when the AP 200 transmits a packet including the low-rate preamble to the station STA1 202, the station STA2 204 cannot decode the low-rate preamble since the receiver of the station STA2 204, if capable of operating at the normal rate only, does not train using the fields LR-STF, LR-LTF1, and so on of the low-rate preamble. Accordingly, the station STA2 204 cannot decode the LR-SIG fields in the low-rate preamble and cannot defer. Instead, the station STA2 204 attempts to determine whether the packet is intended for the station STA2 204 using energy detection. Deferral based on energy detection, however, is less robust than deferral based on SIG field detection.

Accordingly, the station STA2 204 may attempt to transmit to the AP 200 while the AP 200 is transmitting to the station STA1 202. Similarly, the station STA2 204 may be unable to detect when the station STA1 202 is transmitting using a low-rate PHY to the AP 200. Accordingly, the station STA2 204 may mistake the medium to be free and attempt to transmit to the AP 200 while the station STA1 202 is transmitting to the AP 200 using a low-rate PHY.

Figure 4:
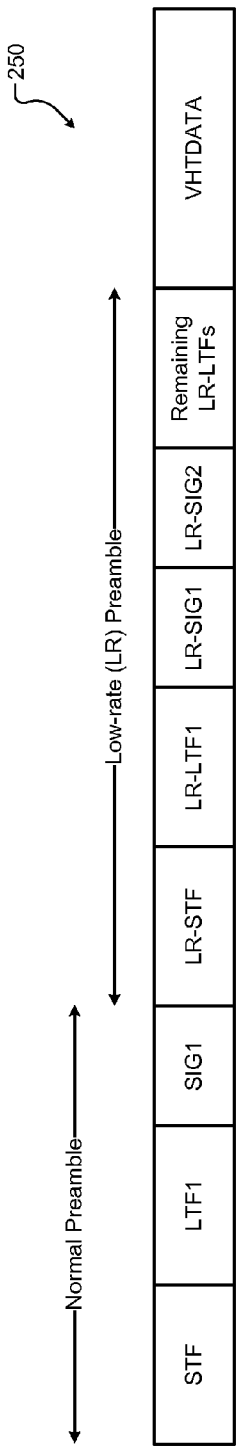
FIG. 4 depicts an example of a low-rate packet including a normal-rate preamble prepended to a low-rate preamble.

Referring now to FIG. 4, a portion of the normal-rate preamble can be prepended to the low-rate preamble when transmitting a packet using a low-rate PHY. For example, the STF, LTF1, and SIG (e.g., SIG1 and/or SIG2) fields of the normal-rate preamble can be prepended to the low-rate preamble when transmitting a packet using a low-rate PHY. Suppose that the AP 200 transmits a packet 250 using a low-rate PHY to the station STA1 202. The packet 250 includes both the low-rate preamble and a portion of the normal-rate preamble prepended to the low-rate preamble as shown.

The station STA2 204 can decode the STF, LTF1, and SIG fields in the portion of the normal-rate preamble. The SIG field in the portion of the normal-rate preamble indicates the duration and/or length of the remainder (i.e., the low-rate preamble and the VHT data portion) of the packet 250. Additionally, the SIG field in the portion of the normal-rate preamble includes an identifier (ID) of the station for which the packet is intended (e.g., ID of the station STA1 202). Accordingly, based on the SIG field in the portion of the normal-rate preamble, the station STA2 204 determines that the packet 250, despite having a portion of the normal-rate preamble, is not intended for the station STA2 204 and defers for the duration indicated by the SIG field.

The station STA1 202 may or may not receive the portion of the normal-rate preamble since the station STA1 202 is farther away from the AP 200 and since the normal-rate preamble is less robust than the low-rate preamble. If the station STA1 202 does not receive the portion of the normal-rate preamble, the station STA1 202 may process the low-rate preamble and process the packet 250 based on the low-rate preamble. For example, the station STA1 202 may defer based on the duration of the remainder of the packet 250 indicated in the LR-SIG field if the packet 250 is not intended for the station STA1 202 but is intended for another station with a low-rate PHY instead.

If the station STA1 202 receives the portion of the normal-rate preamble, the station STA1 202 can determine based on the ID included in the SIG field of the portion of the normal-rate preamble whether the packet 250 is intended for the station STA1 202. Additionally, the SIG field of the portion of the normal-rate preamble can include a bit that indicates whether the packet 250 is a coexistence type packet (i.e., the packet 250 includes a low-rate preamble following the SIG field and is intended for a station with a low-rate PHY). Accordingly, the station STA1 202 can process the low-rate preamble and defer for the duration indicated in the LR-SIG field if the packet 250 is not intended for the station STA1 202.

The station STA1 202 can also transmit packets similar to the packet 250 when transmitting to the AP 200 so that the station STA2 204 can detect, decode, and defer based on the portion of the normal-rate preamble.

Figure 5:
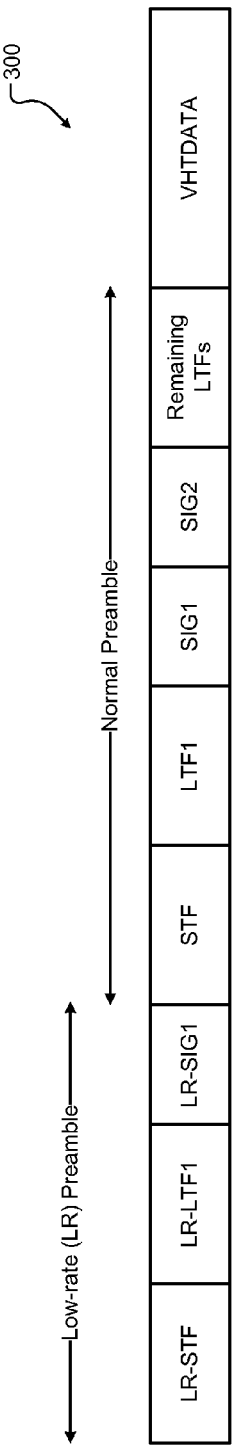
FIG. 5 depicts an example of a normal-rate packet including a low-rate preamble prepended to a normal-rate preamble.

Referring now to FIG. 5, a portion of the low-rate preamble can be prepended to the normal-rate preamble when transmitting a packet using a normal-rate PHY. For example, the LR-STF, LR-LTF1, and LR-SIG (e.g., LR- SIG1 and/or LR-SIG2) fields of the low-rate preamble can be prepended to the normal-rate preamble when transmitting a packet using a normal-rate PHY. Suppose that the AP 200 transmits a packet 300 using a normal-rate PHY to the station STA2 204. The packet 300 includes both the normal-rate preamble and a portion of the low-rate preamble prepended to the normal-rate preamble as shown.

The station STA1 201 can decode the LR-STF, LR-LTF1, and LR-SIG fields in the portion of the low-rate preamble. The LR-SIG field in the portion of the low-rate preamble indicates the duration and/or length of the remainder (i.e., the normal-rate preamble and the VHT data portion) of the packet 300. Additionally, the LR-SIG field in the portion of the low-rate preamble may include an ID of the station for which the packet is intended (e.g., ID of the station STA2 204). Accordingly, based on the LR-SIG field in the portion of the low-rate preamble, the station STA1 202 determines that the packet 300, despite having a portion of the low-rate preamble, is not intended for the station STA1 202 and defers for the duration indicated by the LR-SIG field.

The station STA2 204 can process the packet 300 in two ways depending on whether the station STA2 204 supports 1 MHz operation. If the station STA2 204 does not support 1 MHz operation, the station STA2 204 disregards the portion of the low-rate preamble in the packet 300 and processes the normal-rate preamble. The station STA2 204 determines whether to defer for the duration indicated in the SIG field of the normal-rate preamble depending on whether the packet 300 is intended for the station STA2 204 as indicated by an ID in the SIG field.

If the station STA2 204 supports 1 MHz operation, the station STA2 204 processes the portion of the low-rate preamble. The LR-SIG field in the portion of the low-rate preamble may include an ID of the station for which the packet is intended (e.g., ID of the station STA2 204). Additionally, the LR-SIG field in the low-rate preamble may include a bit that indicates whether the packet 300 is a coexistence type packet (i.e., the packet 300 includes a normal-rate preamble following the LR-SIG field and is intended for a station with a normal-rate PHY). Accordingly, based on the LR-SIG field in the low-rate preamble, the station STA2 204 can determine that the packet 300, despite having a portion of the low-rate preamble, is intended for a station having a normal-rate PHY (e.g., the station STA2 204). The station STA2 204 can process the normal-rate preamble and defer for the duration indicated by the SIG field if the packet 300 is not intended for the station STA2 204 but is intended for another station with a normal-rate PHY instead.

Note that the signal fields in both the normal-rate preamble and the low-rate preamble (e.g., the LR-SIG field and the SIG field) may include the ID of the station for which the packet is intended and the duration of the remainder of the packet, where the remainder is a portion of the packet following the respective signal field. Accordingly, when the station STA2 204 supports 1 MHz operation, the station STA2 204 can determine whether to defer based on the ID and duration information in the LR-SIG field or in the SIG field.

The station STA2 204 can also transmit packets similar to the packet 300 when transmitting to the AP 200 so that the station STA1 202 can detect, decode, and defer based on the portion of the low-rate preamble.

Referring again to FIG. 3, coexistence can be managed in other ways. In FIG. 3, if the station STA2 204 uses a normal-rate PHY to communicate with the AP 200, the station STA2 204 becomes a hidden terminal of the station STA1 202. The station STA2 204 may employ various schemes to protect transmissions of the station STA2 204 from interference due to transmissions from the station STA1 202. For example, the schemes can include energy detection, preamble detection, duration detection, and request-to-send/clear-to-send (RTS/CTS) signaling. None of these protective transmissions (e.g., requests transmitted to the AP 200 to reserve medium for transmitting data) from the station STA2 204, however, may reach the station STA1 202 if the station STA2 204 uses a normal-rate PHY and the station STA1 202 uses a low-rate PHY and is far away. Consequently, the station STA1 202 may start transmitting while the station STA2 204 is transmitting.

The hidden terminal issue can be resolved in many ways as follows. Suppose that the AP 200 includes a normal-rate PHY and a low-rate PHY. In a first solution, if the station STA2 204 uses only a normal-rate PHY, the station STA2 204 can initiate protection (i.e., request that the medium be reserved for transmission) by sending a ready-to-send (RTS) frame or a short frame to the AP 200 using the normal PHY. The station STA2 204 can request the AP 200 to respond by sending a clear-to-send (CTS) or a short frame using both the normal-rate PHY and the low-rate PHY. The AP 200 may send a response using the normal-rate PHY and then send the same response using the low-rate PHY. Alternatively, the AP 200 may send a response using the low-rate PHY and then send the same response using the normal-rate PHY.

In a second solution, the AP 200 may respond by transmitting a special hybrid packet including the normal-rate preamble (with protection duration), the low-rate preamble, and a low-rate payload. Alternatively, the AP 200 may respond by transmitting a special hybrid-PHY packet including the low-rate preamble (with protection duration), the normal-rate preamble, and normal-rate payload. The protection duration indicates a duration for which the medium is reserved for the station STA2 204 to transmit data.

In a third solution, the AP 200 may respond by transmitting a normal-rate packet, followed by a gap, followed by a low-rate no-data packet (NDP) (with protection duration). Alternatively, the AP 200 may respond by transmitting a low-rate packet, followed by a gap, followed by a normal-rate packet (with protection duration). The gap may be a short interframe space (SIFS) or a reduced interframe space (RIFS). In some implementations, the NDP may also be sent before the normal-rate packet or the hybrid packet.

In a fourth solution, the AP 200 may transmit the response frame in duplicate (i.e., via each 1 MHz sub-channel of the 2 MHz channel). Note that a low-rate packet is transmitted in a 1 MHz channel while a normal-rate packet is transmitted in a 2 MHz channel (i.e., in two adjacent 1 MHz channels). Once the protection exchange using any of the above schemes is completed, the station STA2 204 can begin a normal-rate session with the AP 200.

Referring again to FIG. 3, the coexistence issue can be described as follows. If the station STA2 204 uses only a normal-rate PHY (or only a low-rate PHY), the station STA2 204 may not detect/decode protection transmissions from the station STA1 202. While energy detection can help, the station STA2 204 cannot perform early packet filtering to save power and cannot decode a duration field (or an equivalent field) for hidden node protection.

The coexistence issue can be resolved in many ways as follows. If the station STA1 202 uses only a low-rate PHY, the station STA1 202 may initiate a protection session by sending a RTS or a short frame to the AP 200 using the low-rate PHY and request the AP 200 to respond using both the normal-rate PHY and the low-rate PHY. Solutions similar to those described above with reference to the hidden terminal issue may be employed. The station STA1 202 uses the protection to reserve a transmit opportunity (TXOP) for a low-rate session.

If the station STA1 202 can use both the normal-rate PHY and the low-rate PHY, the station STA1 202 can initiate protection or send data by using one of the following: the low-rate PHY only, both the low-rate PHY and the normal-rate PHY, a normal-rate NDP followed by a gap followed by a low-rate packet, or a low-rate NDP followed by a gap followed by a normal-rate packet. The AP 200 may respond to protection initiation by using one of the following: the low-rate PHY only, both the low-rate PHY and the normal-rate PHY, a normal-rate NDP followed by a gap followed by a low-rate packet, or a low-rate NDP followed by a gap followed by a normal-rate packet.

Figure 6:
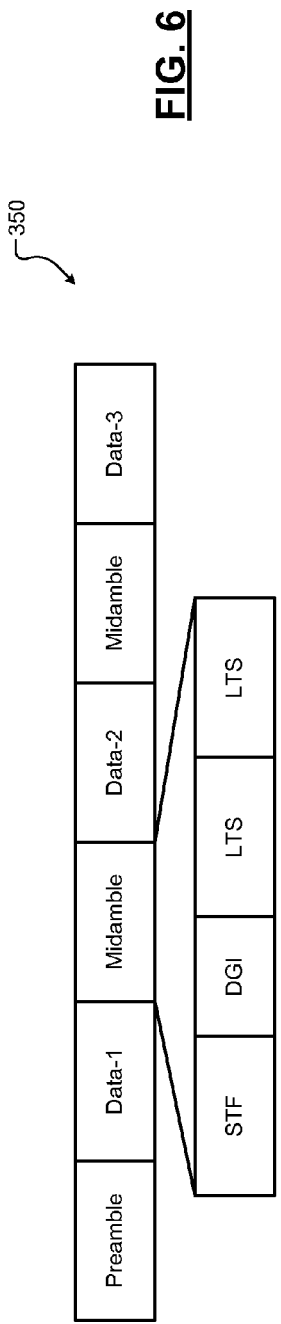
FIG. 6 depicts an example of a packet including a plurality of midambles.

Referring now to FIG. 6, coexistence in 802.11ah-based outdoor applications can be resolved using midambles disclosed in U.S. patent application Ser. No. 12/841,772 filed on Jul. 22, 2010, which is incorporated herein by reference in its entirety. The midambles can also be used to determine presence of wireless transmission. In FIG. 6, a packet 350 with midambles is shown. The midambles follow the preamble and are inserted between two or more data fields as shown. The midambles allow a receiver to retrain its channel equalizer for long packets.

The midambles include a short training field (STF) and multiple long training fields (LTFs). A double guard interval (DGI) may be inserted between the STF and the long training symbols (LTSs). Typically, a station performs clear channel assessment (CCA) by trying to detect the preamble or repetition of cyclic prefix (CP). The station can also perform CCA by detecting the midamble. Detecting a midamble is more robust than detecting mid-packet using CP repetition.

A station may perform CCA and defer using midambles as follows. If a station detects the presence of a midamble, the station should determine that the channel is busy and defer transmission. The presence of a midamble can be determined by the presence of STF and one or more LTFs. If the standard specifies midambles after every N symbols, where N is an integer greater than 1, the station can go into power save mode for N (or a multiple of N) symbols, wake up after the N (or a multiple of N) symbols, and try to determine if the packet transmission has ended by detecting a midamble. If no midamble is detected, the station should also perform CCA using preamble detection and guard interval (GI) repetition. A station in a 1 MHz basic service set (BSS) (i.e., a 1 MHz STA) can detect the presence of STF and LTF transmitted in a 2 MHz channel and therefore determine that a 2 MHz transmission is ongoing. The 1 MHz STA using this method will therefore defer.

IEEE 802.11ah defines a normal-rate PHY (NP) and a low-rate PHY (LRP) and may allow two types of devices: single PHY devices having only the normal-rate PHY (NP-only devices) and dual-PHY devices having the normal-rate PHY and the low-rate PHY. A NP-only device can detect partial or whole preamble of LRP transmissions (e.g., the LR-STF, LR-LTF, and/or LR-SIG fields).

The NP-only device sets clear channel access (CCA) status to busy when a partial or whole preamble of a LRP transmission is detected or when a signal energy greater than or equal to a predetermined threshold is detected. The STF of the normal-rate preamble and the LR-STF of the low-rate preamble can be designed with similar structure such that CCA of an NP-only device can be triggered by the LR-STF. For example, the LR-STF can have the same periodicity as the STF. Alternatively, the periodicity of the LR-STF can be 1/N times the periodicity of the STF, where N is an integer greater than 1. Therefore, an autocorrelator in the receiver of the NP-only device is triggered by STF and LR-STF. The remaining portion of the low-rate preamble (i.e., the LR-LTF and the LR-SIG fields) can be different than the corresponding fields of the normal-rate preamble.

Figure 7A:
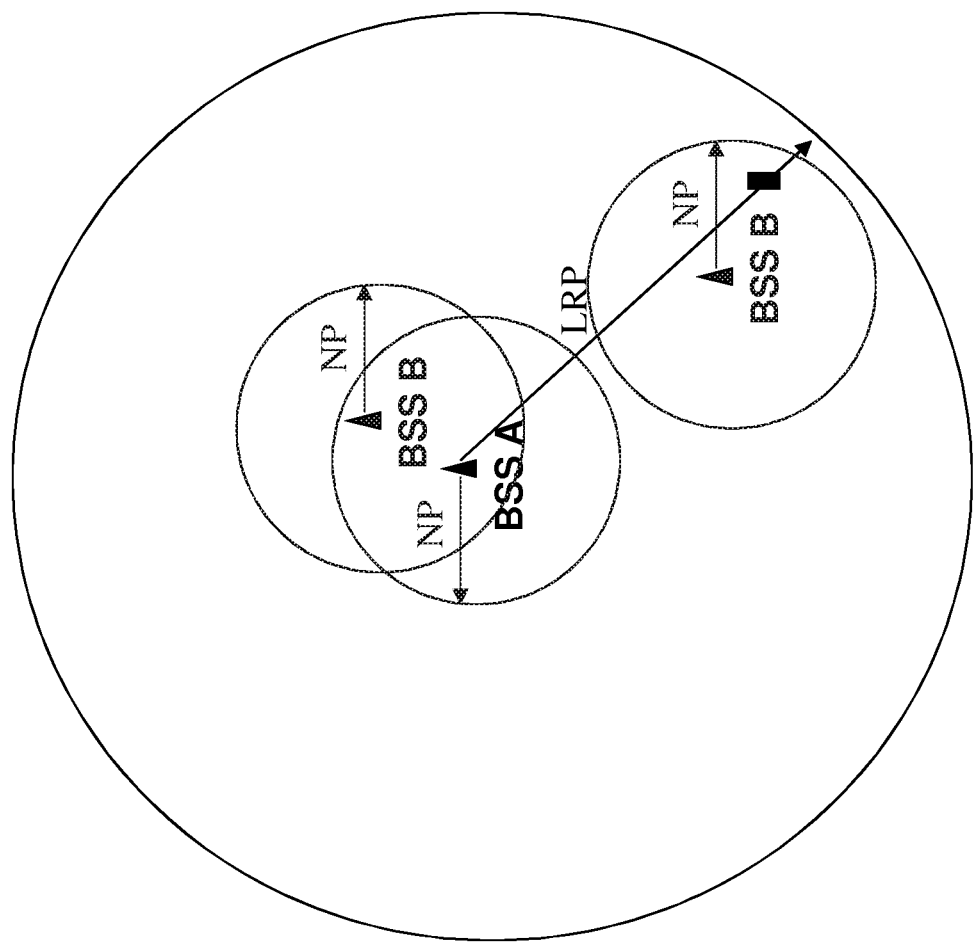
FIG. 7A depicts an example of a plurality of overlapping basic service sets, where the basic service sets include normal-rate physical layer network devices.
Figure 7B:
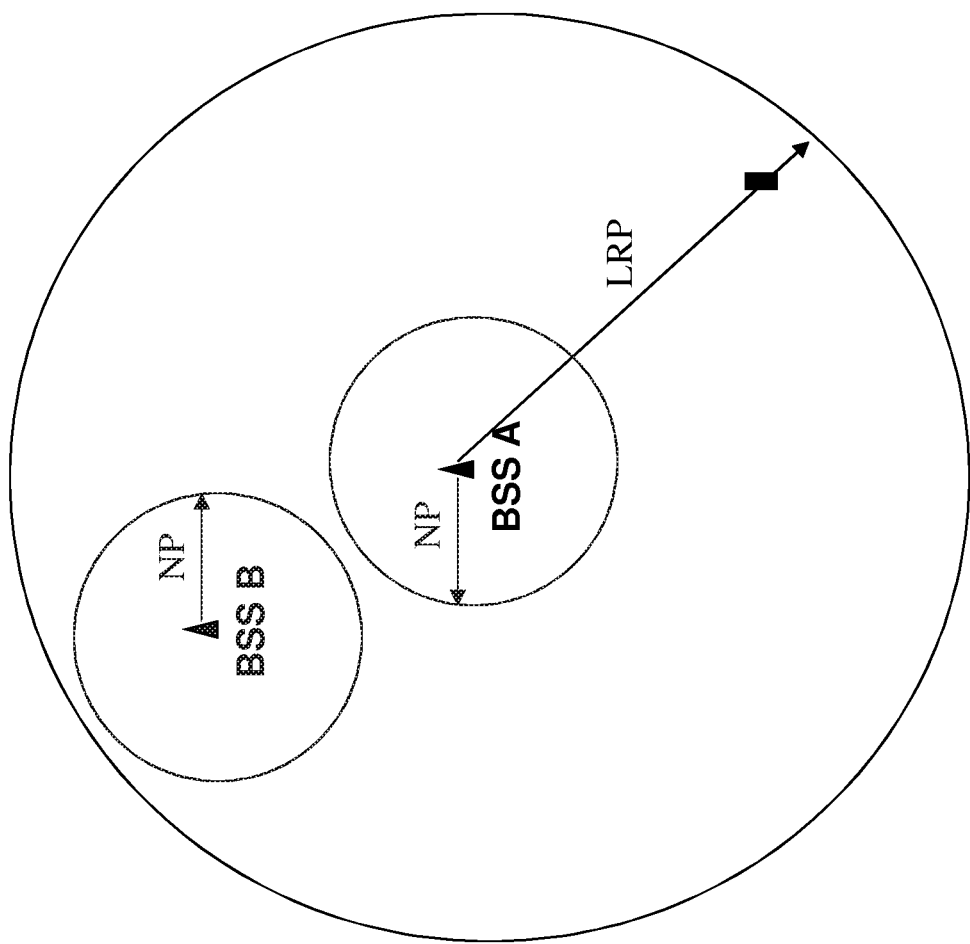
FIG. 7B depicts an example of a plurality of overlapping basic service sets, where the basic service sets include normal-rate and low-rate physical layer network devices.

Referring now to FIGS. 7A and 7B, examples of coexistence scenarios are shown. In a first scenario shown in FIG. 7A, stations belonging to different basic service sets (BSSs) are shown. For example, one station belonging to a BSS A and two stations belonging to a BSS B are shown. Suppose that stations in BSS B are NP-only devices (i.e., have only normal-rate PHYs or NPs) and that stations in BSS A are dual-PHY devices (i.e., have normal-rate and low-rate PHYs). Large and small circles denote long and short ranges of NP and LRP transmissions from different stations. Suppose further that BBS A and BSS B are NP-overlapping BSSs (NP-OBSSs). That is, when the stations in BSS A and BSS B transmit using NPs, the transmissions can interfere with each other. Suppose also that LRP transmissions from stations in BSS A can be detected by stations in BSS B.

NP transmission and/or protection request from a station in BSS B can reach stations in BSS A and can prevent interference from stations in BSS A at least partially. LRP transmission from a station in BSS A can be detected at least partially by stations in BSS B and may heavily interfere with transmissions from stations in BSS B. Since BSS B is in close proximity to some of the stations in BSS A, the stations in BSS B should respect the detected LRP transmissions from the stations in BSS A and defer their transmissions.

In a second scenario shown in FIG. 7B, for example, one station belonging to a BSS A and one station belonging to a BSS B are shown. Suppose that stations in BSS B are NP-only devices and that stations in BSS A are dual-PHY devices. Suppose further that BSS A and BSS B are not NP-OBSS, but are LRP-overlapping BSSs (LRP-OBSSs) instead. That is, NP transmissions of stations in BSS A and BSS B do not interfere with each other, but LRP transmissions of stations in BSS A can be detected by stations in BSS B.

NP transmission and/or protection request from a station in BSS B cannot reach stations in BSS A and cannot prevent interference due to LRP transmissions from stations in BSS A. LRP transmission from a station in BSS A can be detected at least partially by stations in BSS B but may not cause heavy interference to transmissions from stations in BSS B. If stations in BSS B do not detect heavy NP and/or LRP transmissions in the neighborhood (e.g., if NP and/or LRP transmissions are less than or equal to a predetermined threshold), the stations in BSS B may still access the medium even when a low-rate preamble is detected.

A Network Allocation Vector (NAV) is a virtual carrier sensing mechanism used with wireless network protocols such as IEEE 802.11 and IEEE 802.16 (WiMax). The virtual carrier sensing limits the need for physical carrier sensing to save power. MAC layer frame headers include a duration field that specifies a transmission time required for the frame, in which time the medium will be busy. Stations listening on the medium read the duration field and set their NAV, which indicates to a station how long the station must defer from accessing the medium.

Following are examples of coexistence rules and approaches. Conservatively, if an NP-only device can decode the LR-SIG field of a low-rate packet (i.e., a packet that is transmitted using a LP and that includes a low-rate preamble and data), the NP-only device should defer channel access until the end of the low-rate packet or until the end of the transmission sequence. If the NP-only device can detect LR-STF and/or LR-LTF, but cannot decode the LR-SIG field of a low-rate packet, the NP-only device should defer channel access until the LP-only device correctly decodes a SIG field of a frame (such as a normal-rate packet, which is a packet that is transmitted using a NP and that includes a normal-rate preamble and data). Alternatively, the NP-only device should defer channel access until a frame sequence is detected by which the NP-only device can correctly set its Network Allocation Vector (NAV). Alternatively, the NP-only device should defer channel access until expiration of a predetermined period, such as a maximum possible duration of a low-rate packet or of a single transmission sequence.

To prevent a device from occupying the medium continuously by using short low-rate packets, a duty cycle threshold/limit (e.g., X) can be enforced for the usage of LRP. For example, once a device starts to access the medium successfully, the device can continuously access the medium by using LRP for a maximum period A. After the end of the maximum period A, the device should not access the medium by using LRP for at least a period B. The duty cycle A/(A+B) should be less than or equal to X.

Aggressively, an NP-only station should defer channel access based on a detected LRP transmission only if the LRP transmission is very strong, e.g. greater than or equal to an energy detection threshold (typically 20 dB less than the preamble/STF detection threshold). Using this approach, however, if a dual-PHY station using LRP is close to the NP-only station, the NP-only station may keep ignoring and keep blocking the weak LRP transmissions to the dual-PHY station.

Following are examples of compromise coexistence approaches. An NP-only station should defer channel access based on a detected LRP transmission only if the transmission is stronger than a threshold between the typical energy detection threshold and a preamble/STF detection threshold. The NP-only station should defer the channel access for a predetermined period (such as a maximum low-rate packet period or a maximum transmit opportunity (TXOP) period) unless the NP-only station detects a duration from a detected SIG field or a NAV duration before the end of the predetermined period.

If a dual-PHY station fails to perform a LRP transmission for one or more times, the dual-PHY station may send a special protection request for subsequent LRP transmissions and retransmissions. For example, the dual-PHY station may send the special protection request using a special LR-STF (e.g., a longer LR-STF) for the subsequent retransmissions. When an NP-only station detects the special LR-STF (or special protection request), the NP-only station should defer channel access. If the NP-only station does not detect the special LR-STF (or special protection request), the NP-only station defers channel access only when a transmission stronger than the energy detection threshold is detected.

In some implementations, an NP-only device may be capable of only energy detection. If an NP-only device is unable to detect the LR-STF of any low-rate packet, the NP-only device has to rely on energy detection for channel access and may not be able to detect weak LRP transmissions. To prevent such a NP-only device from accessing the medium by aggressively disregarding the devices using LRP, a duty cycle threshold/limit can be enforced to limit such a NP-only device from accessing a common medium for a long period.

Channel selection may be made as follows. A BSS including NP-only stations should avoid using existing LRP channels as NP primary channel. More generally, once NP-only stations detect LRP transmissions in one channel, the NP-only stations should still be able to use other idle channels for transmissions.

Figure 8:
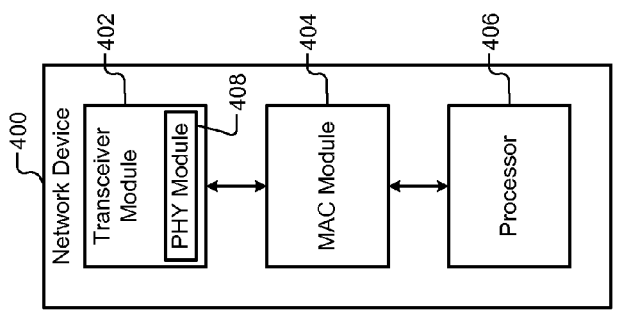
FIG. 8 is a functional block diagram of a network device.

Referring now to FIG. 8, a network device 400 includes a transceiver module 402, a medium access controller (MAC) module 404, and a processor 406. The network device 400 may include an access point (AP) or a client station (STA). The transceiver module 402 includes a physical layer (PHY) module 408 that transmits and receives data via one or more antennas (not shown). Although one PHY module 408 is shown, the transceiver module 402 may include a plurality of PHY modules. The MAC module 404 controls access to medium. The processor 406 processes the data received and to be transmitted by the network device 400.

Figure 9A:
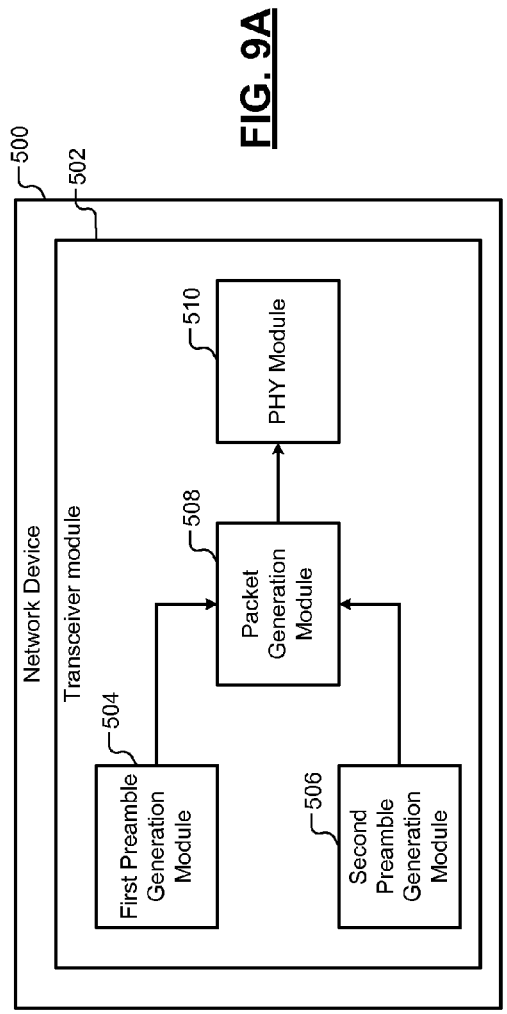
FIG. 9A is a functional block diagram of a network device including a hybrid physical layer that operates at a normal rate and a low-rate.
Figure 9B:
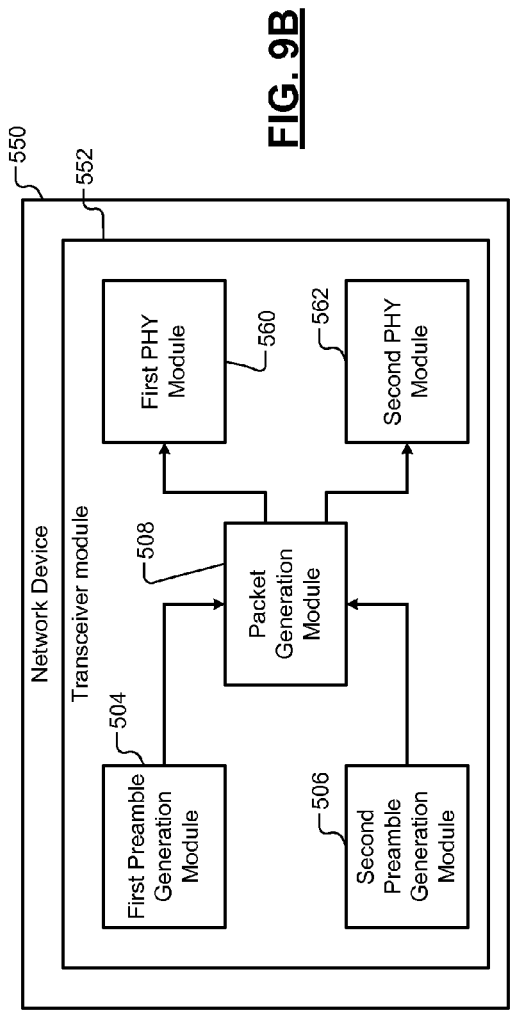
FIG. 9B is a functional block diagram of a network device including a normal-rate physical layer and a low-rate physical layer.

Referring now to FIGS. 9A and 9B, network devices 500 and 550 are shown, respectively. Each of the network devices 500 and 550 may include an AP or a STA. The network devices 500 and 550 include different PHYs. In FIG. 9A, the network device 500 includes a transceiver module 502. The transceiver module 502 includes a first preamble generation module 504, a second preamble generation module 506, a packet generation module 508, and a PHY module 510. The PHY module 510 may communicate with the medium via one or more antennas (not shown). In FIG. 9B, the network device 550 includes a transceiver module 552. The transceiver module 552 includes the first preamble generation module 504, the second preamble generation module 506, the packet generation module 508, a first PHY module 560, and a second PHY module 562. The PHY modules 560 and 562 may communicate with the medium via one or more antennas (not shown).

The first preamble generation module 504 is configured to generate a first preamble. The first preamble includes a first training field to train receivers operating at a first data rate. For example, the first training field includes a first short training field. Additionally, the first preamble includes a first long training field and a first signal field. The second preamble generation module 506 is configured to generate a second preamble. The second preamble includes a second training field to train receivers operating at a second data rate. For example, the second training field includes a second short training field. Additionally, the second preamble includes a second long training field and a second signal field. The second data rate is different that the first data rate. For example, the first data rate is the normal-rate, and the second data rate is the low-rate. Alternatively, the first data rate is the low-rate, and the second data rate is the normal-rate.

The packet generation module 508 is configured to generate a packet. The packet includes the second preamble followed by the first preamble when the packet is transmitted at the first data rate. Alternatively, the first preamble is followed by the second preamble when the packet is transmitted at the second data rate.

In FIG. 9A, the physical layer module 510 is configured to transmit the packet at the first data rate when the packet includes the second preamble followed by the first preamble. The physical layer module 510 is configured to transmit the packet at the second data rate when the packet includes the first preamble followed by the second preamble. Accordingly, the physical layer module 510 may be called a hybrid physical layer capable of transmitting and receiving a hybrid packet including portions of a first packet generated at the first data rate and a second packet generated at the second data rate.

In FIG. 9B, the first physical layer module 560 is configured to transmit the packet at the first data rate when the packet includes the second preamble followed by the first preamble. The second physical layer module 562 is configured to transmit the packet at the second data rate when the packet includes the first preamble followed by the second preamble.

Figure 10:
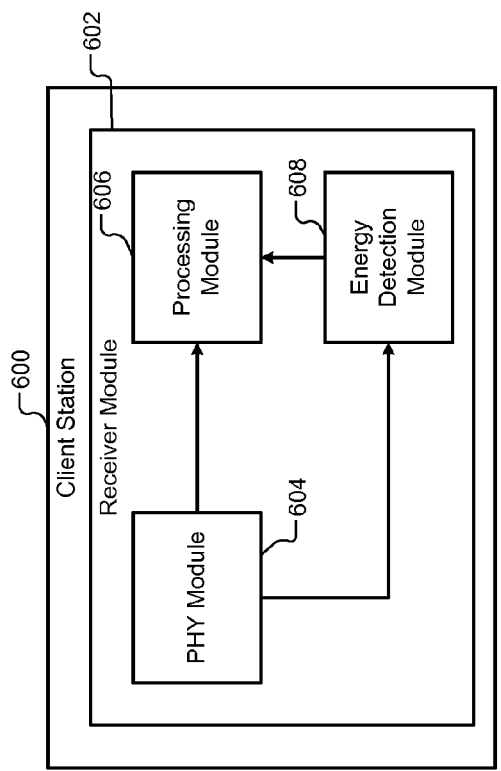
FIG. 10 is a functional block diagram of a client station capable of performing energy detection.

Referring now to FIG. 10, a client station 600 includes a receiver module 602. The receiver module 602 includes a PHY module 604, a processing module 606, and an energy detection module 608. The PHY module 604 may communicate with the medium via one or more antennas (not shown). In the discussion below, the second data rate is different that the first data rate. For example, the first data rate is the normal-rate, and the second data rate is the low-rate. Alternatively, the first data rate is the low-rate, and the second data rate is the normal-rate.

The physical layer module 604 is configured to receive a packet via the medium. The packet includes a first preamble followed by a second preamble. The first preamble is generated based on a first data rate. The second preamble is generated based on a second data rate. At least one of the first preamble and the second preamble includes a duration of the packet.

The processing module 606 is configured to process the first preamble when the receiver module 602 operates at the first data rate. The processing module 606 is configured to process the second preamble when the receiver module 602 operates at the second data rate. The processing module 606 is configured to determine whether to defer accessing the medium for the duration of the packet based on the processing of the first preamble or the second preamble.

The first preamble includes a first training field (e.g., a first short training field) to train receivers operating at the first data rate and a first signal field to indicate the duration of the packet. The processing module 606 is configured to process the first preamble when the receiver module 602 operates at the first data rate and trains on the first training field. The processing module 606 is configured to determine the duration of the packet based on the first signal field. The processing module 606 is configured to detect an identifier in the first signal field and decide not to access the medium for the duration of the packet when the identifier indicates that the packet is not indented for the receiver module 602.

The second preamble includes a second training field (e.g., a second short training field) to train receivers operating at the second data rate and a second signal field to indicate the duration of the packet. The processing module 606 is configured to process the second preamble when the receiver module 602 operates at the second data rate and trains on the second training field. The processing module 606 is configured to determine the duration of the packet based on the second signal field. The processing module 606 is configured to detect an identifier in the second signal field and decide not to access the medium for the duration of the packet when the identifier indicates that the packet is not indented for the receiver module 602.

When the packet includes data generated at the second rate and the receiver module 602 is configured to operate at the second rate, the processing module 606 is configured to process the first preamble, determine whether the packet includes data generated at the second rate based on the processing of the first preamble, process the second preamble in response to determining that the packet includes data generated at the second rate, and determine the duration of the packet based on the processing of the second preamble. The processing module 602 is configured to detect an identifier in the second preamble and decide not to access the medium for the duration of the packet when the identifier indicates that the packet is not indented for the receiver module 602.

When the packet includes data generated at the first rate and the receiver module 602 is configured to operate at the first rate and the second rate, the processing module 606 is configured to process the first preamble, determine whether the packet includes data generated at the second rate based on the processing of the first preamble, process the second preamble in response to determining that the packet includes data generated at the second rate, and determine the duration of the packet based on the processing of the second preamble. The processing module 606 is configured to detect an identifier in the second preamble and decide not to access the medium for the duration of the packet when the identifier indicates that the packet is not indented for the receiver module 602.

Figure 11:
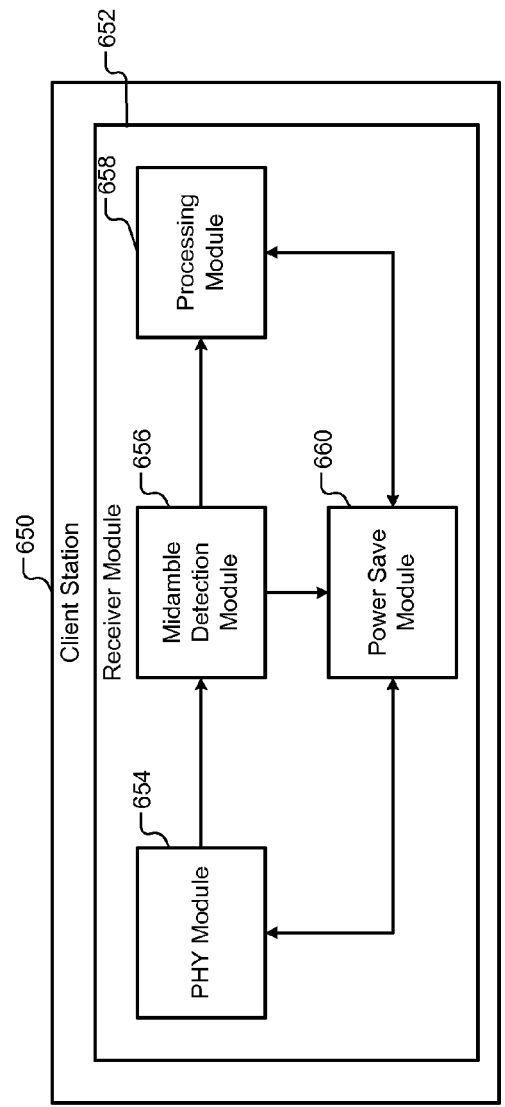
FIG. 11 is a functional block diagram of a client station capable of detecting midambles.

Referring now to FIG. 11, a client station 650 includes a receiver module 652. The receiver module 652 includes a PHY module 654, a midamble detection module 656, a processing module 658, and a power save module 660. The PHY module 654 may communicate with the medium via one or more antennas (not shown). The midamble detection module 656 is configured to detect a midamble of a packet transmitted by a network device via a channel. The packet may include a preamble, a midamble, and a plurality of data fields. The preamble may include a first short training field, a first long training field, and a signal field. The midamble may include a second short training field and a second long training field. The midamble follows the preamble and is between two or more of the data fields (e.g., see FIG. 6). The processing module 658 is configured to determine that the channel is busy when a midamble is detected in the packet.

A midamble may be present in the packet following every predetermined number of data symbols (e.g., after every N data symbols, where N is an integer greater than 1). The power save module 660 is configured to operate the client station 650 in a power save mode for a duration of the predetermined number of data symbols or for a duration of a multiple of the predetermined number of data symbols. The power save module 660 is configured to wake up the client station 650 following the duration. After the client station 650 wakes up, the processing module 658 is configured to determine that the channel is busy if a midamble is detected in the packet. If a midamble is not detected in the packet, the processing module 658 is configured to determine whether the channel is busy based on the preamble.

The physical layer module 654 is configured to communicate at a first data rate via a first sub-channel or via a second sub-channel of the channel. The midamble detection module 656 is configured to detect the midamble in the first sub-channel or in the second sub-channel when the midamble is transmitted at a second data rate via the first sub-channel and the second sub-channel, where the second data rate is greater than the first data rate. For example, the second data rate is the normal-rate, and the first data rate is the low-rate. If the midamble is detected in the first sub-channel or the second sub-channel, the processing module 658 is configured to determine that a transmission at the second data rate is ongoing in the channel and decide not to access the channel.

Referring again to FIG. 10, the physical layer module 604 is configured to communicate at a first data rate via a channel, where the channel includes a first sub-channel and a second sub-channel of the channel. The physical layer module 604 is configured to receive a first packet including a first preamble transmitted at the first data rate via the first sub-channel and the second sub-channel. The physical layer module 604 is configured to receive a second packet including a second preamble transmitted at a second data rate via the first sub-channel or the second sub-channel, where the second data rate is less than the first data rate. For example, the second data rate is the normal-rate, and the first data rate is the low-rate.

The processing module 606 is configured to process the first preamble transmitted at the first data rate and at least a portion of the second preamble transmitted at the second data rate. The processing module 606 is configured to determine that the channel is busy on detecting least the portion of the second preamble transmitted via the first sub-channel or the second sub-channel. The energy detection module 608 is configured to detect an energy level in the channel and determine that the channel is busy when the energy level being greater than or equal to a predetermined threshold.

The first preamble includes a first short training field having a first periodicity and a first remainder (e.g., a long training field and a signal field). The second preamble includes a second short training field having a second periodicity and a second remainder (e.g., a long training field and a signal field). The first remainder is different than the second remainder. The second periodicity is equal to the first periodicity divided by an integer greater than or equal to one. Each of the first short training field and the second short training field activates the processing module 606 (e.g., an autocorrelator in the processing module 606) to process the first preamble transmitted at the first data rate and at least the portion of the second preamble transmitted at the second data rate.

The processing module 606 is configured to process the signal field of the second remainder, determine a duration of the second packet based on processing the signal field of the second remainder, and defer accessing the channel for the duration. The processing module 606 is configured to process the second short training field of the second preamble and the long training field of the second remainder of the second preamble. If the processing module 606 is unable to process the signal field of the second remainder, the processing module 606 is configured to defer accessing the channel until one of the following: the processing module 606 detects a signal field of the first preamble; the processing module 606 detects a frame sequence to set a network allocation vector; or expiration of a predetermined period corresponding to a duration of the second packet or a single transmission sequence.

The processing module 606 is configured to defer accessing the channel for a first predetermined period; access the channel at an end of the first predetermined period; and subsequent to gaining access to the channel at the end of the first predetermined period, access the channel for a second predetermined period. The first predetermined period and the second predetermined period are based on a predetermined duty cycle assigned to a device transmitting the second packet. The device accesses the channel during the first predetermined period and does not access the channel during the second predetermined period.

The energy detection module 608 is configured to detect an energy level of the second packet. The processing module 606 is configured to defer accessing the channel if the energy level is greater than or equal to a predetermined threshold.

The processing module 606 is configured to defer accessing the channel if the energy level is greater than or equal to a predetermined energy detection threshold and if the energy level is less than or equal to a preamble detection threshold.

The processing module 606 is configured to defer accessing the channel for a predetermined period unless the processing module 606 detects, prior to expiration of the predetermined period, a duration of the first packet or the second packet respectively from a signal field of the first preamble or the second preamble or a network allocation vector duration.

The second preamble includes a short training field and may be transmitted by a device configured to transmit the first preamble via the channel at the first data rate and the second preamble via the first sub-channel or the second sub-channel at the second data rate. A length of the short training field in the second preamble may be increased if a transmission from the device at the second rate fails a plurality of times. The energy detection module 608 is configured to detect an energy level of the second packet. The processing module 606 is configured to defer accessing the channel on detecting the short training field having the increased length. Alternatively, the processing module 606 is configured to defer accessing the channel if the energy level is greater than or equal to a predetermined threshold and if the short training field having the increased length is not detected.

The processing module 606 is configured to defer accessing the channel if the energy level is greater than or equal to a predetermined threshold and id the second preamble is not detected. Subsequent to gaining access to the channel based on the energy level, the processing module 606 is configured to access the channel for a first predetermined period. The processing module 606 is configured to stop accessing the channel after expiration of the first predetermined period. The processing module 606 is configured to not access the channel for a second predetermined period following the expiration of the first predetermined period. The first predetermined period and the second predetermined period are based on a predetermined duty cycle.

Referring again to FIG. 9B, the network device 550 may include an access point (AP). The first physical layer module 560 is configured to communicate at a first data rate via a first sub-channel and a second sub-channel of a channel. The second physical layer module 562 is configured to communicate at a second data rate via the first sub-channel or the second sub-channel. The first data rate is greater than the second data rate. For example, the first data rate is the normal-rate, and the second data rate is the low-rate.

The first physical layer module 560 is configured to receive a request from a first client station (e.g., station STA2 204 in FIG. 3) to reserve the channel for transmitting data from the first client station to the access point at the first data rate. The request is not received by a second client station (e.g., station STA1 202 in FIG. 3) configured to transmit data to the access point via the first sub-channel or the second sub-channel at the second rate.

In response to receiving the request from the first client station, the access point is configured to transmit a response to allow the first client station to transmit data via the channel and to prevent the second client station from transmitting data via the first sub-channel or the second sub-channel while the first client station transmits data to the access point via the channel.

When the first client station receives the response, the first physical layer module 562 is configured to receive data from the first client station without interference from the second client station. The request and the response may be of different types and may be transmitted in different ways as follows.

For example, the request may include a ready-to-send frame, and the response may include a clear-to-send frame. The first physical layer module 560 and the second physical layer module 562 may send the clear-to-send frame.

The first physical layer module 560 may transmit the response prior to the second physical layer module 562 transmitting the response, and the second physical layer module 562 may transmit the response subsequent to the first physical layer module 560 transmitting the response. Alternatively, the second physical layer module 562 may transmit the response prior to the first physical layer module 560 transmitting the response, and the first physical layer module 560 may transmit the response subsequent to the second physical layer module 562 transmitting the response.

The response may include a hybrid packet, where the hybrid packet includes a first preamble generated at the first data rate, a second preamble generated at the second data rate, and a payload generated at the second data rate. The first preamble may include a duration for which the channel is reserved for the first client station to transmit data to the access point.

The response may include a hybrid packet, where the hybrid packet includes a first preamble generated at the second data rate, a second preamble generated at the first data rate, and a payload generated at the first data rate. The first preamble may include a duration for which the channel is reserved for the first client station to transmit data to the access point.

The response may include a first packet followed by a gap and a second packet. The first packet may be generated at the first data rate. The second packet may be generated at the second data rate. The second packet may include no payload (i.e., the second packet may be a no data packet or NDP) and a preamble. The preamble may include a duration for which the channel is reserved for the first client station to transmit data to the access point.

The response may include a first packet followed by a gap and a second packet. The first packet may be generated at the second data rate. The second packet may be generated at the first data rate. The second packet may include no payload (i.e., the second packet may be a no data packet or NDP) and a preamble. The preamble may include a duration for which the channel is reserved for the first client station to transmit data to the access point.

Referring again to FIG. 9B, the network device 550 may include an access point (AP). The first physical layer module 560 is configured to communicate at a first data rate via a first sub-channel and a second sub-channel of a channel. The second physical layer module 562 is configured to communicate at a second data rate via the first sub-channel or the second sub-channel. The first data rate is greater than the second data rate. For example, the first data rate is the normal-rate, and the second data rate is the low-rate.

The second physical layer module 562 is configured to receive a request from a first client station (e.g., station STA1 202 in FIG. 3) to reserve the first sub-channel or the second sub-channel for transmitting data from the first client station to the access point at the second data rate. The request cannot be processed by a second client station (e.g., station STA2 204 in FIG. 3) configured to transmit data to the access point via channel at the first rate.

In response to receiving the request from the first client station, the access point is configured to transmit a response to allow the first client station to transmit data via the first sub-channel or the second sub-channel and prevent the second client station from transmitting data via the channel while the first client station transmits data to the access point via the first sub-channel or the second sub-channel.

When the first client station receives the response, the first physical layer module 562 is configured to receive data from the first client station without interference from the second client station. The request and the response may be of different types and may be transmitted in different ways as follows.

For example, the request may include a ready-to-send frame, and the response may include a clear-to-send frame. The first physical layer module 560 and the second physical layer module 562 may send the clear-to-send frame.

The first physical layer module 560 may transmit the response prior to the second physical layer module 562 transmitting the response, and the second physical layer module 562 may transmit the response subsequent to the first physical layer module 560 transmitting the response. Alternatively, the second physical layer module 562 may transmit the response prior to the first physical layer module 560 transmitting the response, and the first physical layer module 560 may transmit the response subsequent to the second physical layer module 562 transmitting the response.

The response may include a hybrid packet, where the hybrid packet includes a first preamble generated at the first data rate, a second preamble generated at the second data rate, and a payload generated at the second data rate. The first preamble may include a duration for which the channel is reserved for the first client station to transmit data to the access point.

The response may include a hybrid packet, where the hybrid packet includes a first preamble generated at the second data rate, a second preamble generated at the first data rate, and a payload generated at the first data rate. The first preamble may include a duration for which the channel is reserved for the first client station to transmit data to the access point.

The response may include a first packet followed by a gap and a second packet. The first packet may be generated at the first data rate. The second packet may be generated at the second data rate. The second packet may include no payload (i.e., the second packet may be a no data packet or NDP) and a preamble. The preamble may include a duration for which the channel is reserved for the first client station to transmit data to the access point.

The response may include a first packet followed by a gap and a second packet. The first packet may be generated at the second data rate. The second packet may be generated at the first data rate. The second packet may include no payload (i.e., the second packet may be a no data packet or NDP) and a preamble. The preamble may include a duration for which the channel is reserved for the first client station to transmit data to the access point.

Referring again to FIGS. 3 and 9B, a first client station (e.g., station STA1 202 in FIG. 3) may communicate with an access point (e.g., the AP 200 in FIG. 3) in presence of a second client station (e.g., station STA2 204 in FIG. 3) as follows. The AP 200 may include the network device 550 of FIG. 9B. The first client station may also include the network device 550 of FIG. 9B. The second client station may be capable of communicating at a first data rate (e.g., the normal-rate).

The first client station may include a first physical layer module (e.g., 560) configured to communicate at the first data rate via a first sub-channel and a second sub-channel of a channel. The first client station may include a second physical layer module (e.g., 562) configured to communicate at a second data rate (e.g., the low-rate) via the first sub-channel or the second sub-channel. The first data rate is greater than the second data rate. The first client station is configured to communicate with the access point that is associated with the second client station.

The first client station is configured to transmit a request to the access point to reserve the channel for transmitting data at the first data rate or to reserve the first sub-channel or the second sub-channel for transmitting data at the second data rate. The first client station is also configured to transmit data to the access point without interference from the second client station. The first client station is configured to transmit the request and the data using one of the following: the second physical layer module only; the first physical layer module and the second physical layer module; transmission of a first packet followed by a gap and a second packet, where the first packet is generated at the first data rate, where the first packet includes no payload and includes a preamble, and where the second packet is generated at the second data rate and includes payload; or transmission of the second packet followed by the gap and the first packet.

The access point is configured to transmit a response to allow the first client station to transmit data using the first physical layer module via the channel or using the second physical layer module via the first sub-channel or the second sub-channel and prevent the second client station from transmitting data via the channel while the first client station transmits data to the access point.

The access point includes a first physical layer module (e.g., 560) configured to communicate at the first data rate via the first sub-channel and the second sub-channel. The access point may include a second physical layer module (e.g., 562) configured to communicate at the second data rate via the first sub-channel or the second sub-channel. The access point transmits the response using one of the following: the second physical layer module only; the first physical layer module and the second physical layer module; transmission of a first packet followed by the gap and a second packet, where the first packet is generated at the first data rate, where the first packet includes no payload and includes a preamble, where the preamble includes a duration for which the channel is reserved for the first client station to transmit data to the access point, and where the second packet is generated at the second data rate and includes payload; or transmission of the second packet followed by the gap and the first packet.

Figure 12:
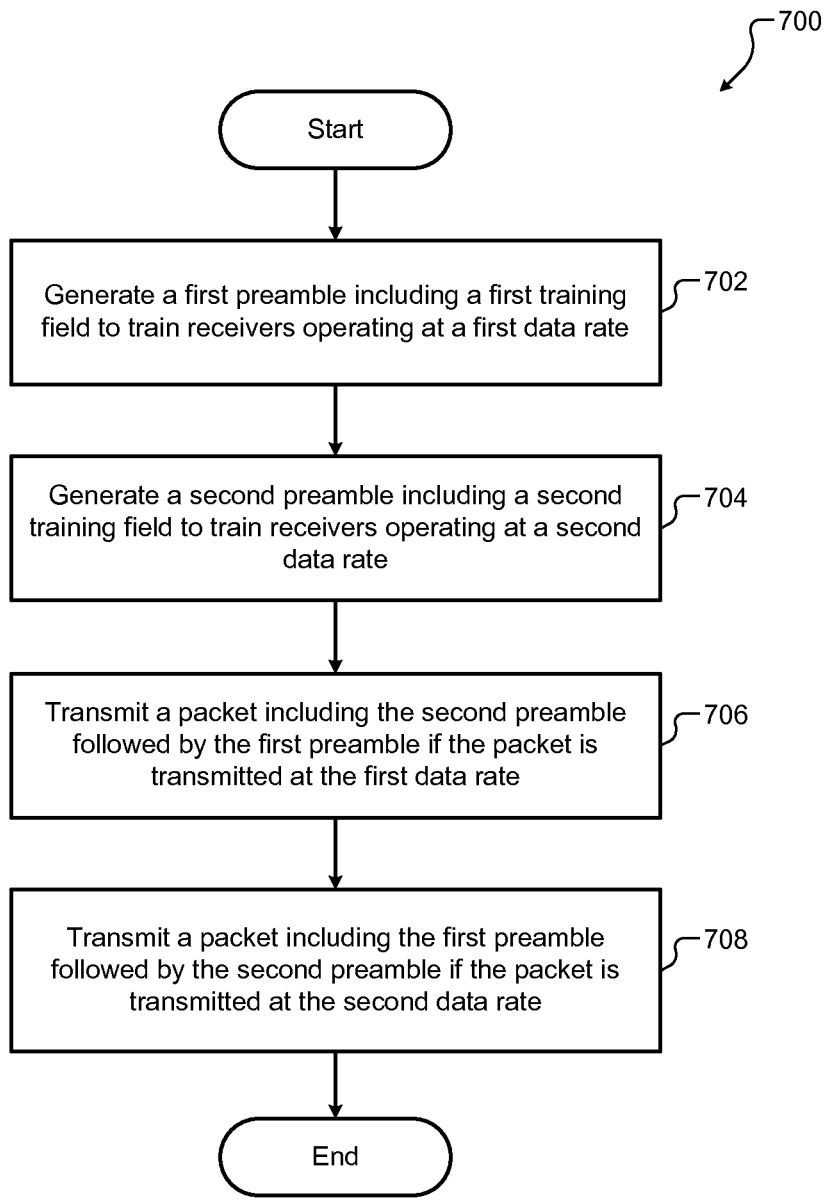
FIG. 12 is a flowchart of a method for transmitting a packet according to the present disclosure.

Referring now to FIG. 12, a method 700 for transmitting a packet according to the present disclosure is shown. At 702, control generates a first preamble including a first training field to train receivers operating at a first data rate. At 704, control generates a second preamble including a second training field to train receivers operating at a second data rate, where the second data rate is different than the first data rate. At 706, control transmits a packet including the second preamble followed by the first preamble if the packet is transmitted at the first data rate. At 708, control transmits a packet including the first preamble followed by the second preamble if the packet is transmitted at the second data rate.

Figure 13A:
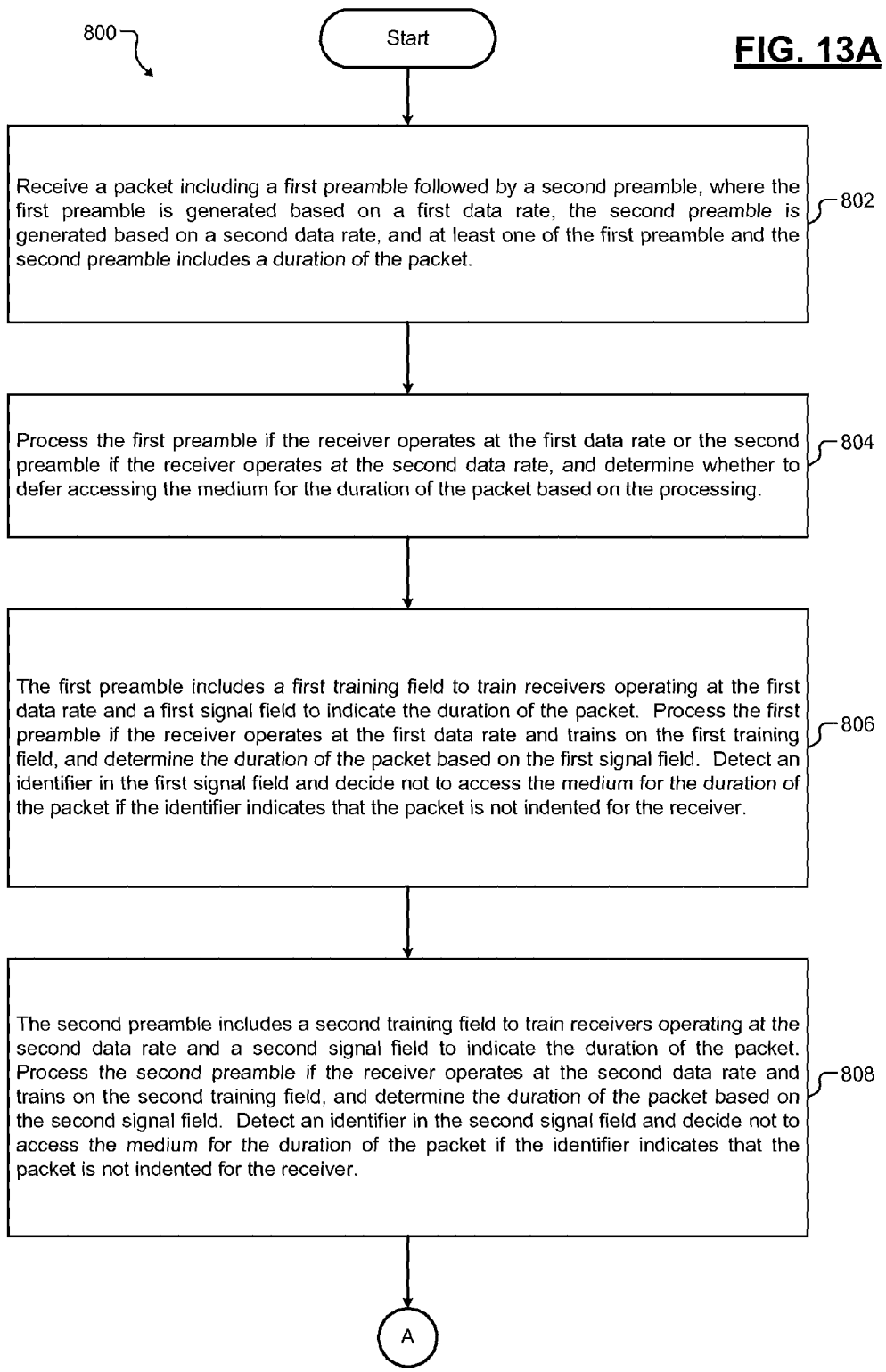
FIGS. 13A and 13B depict a flowchart for a method for processing a received packet according to the present disclosure.
Figure 13B:
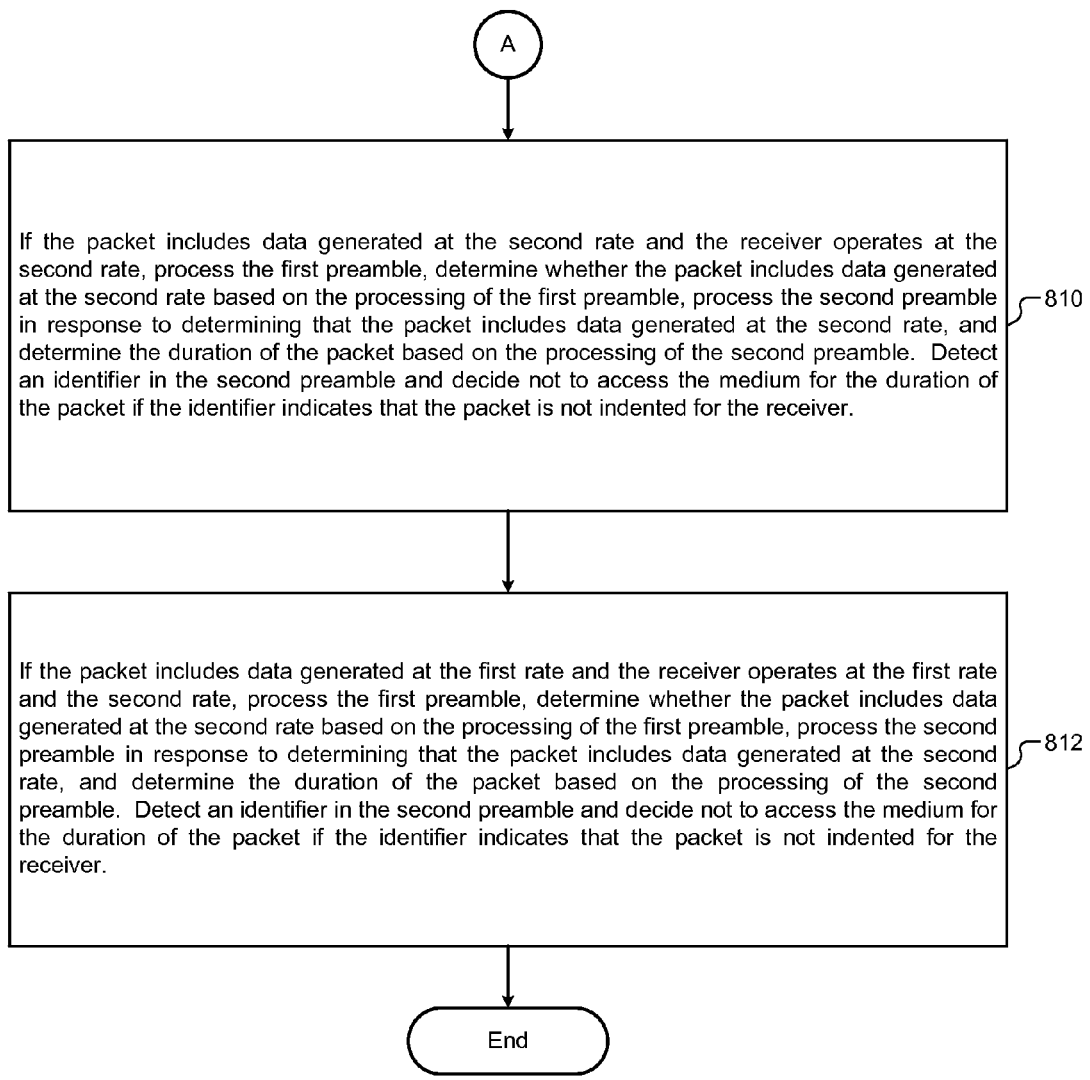

Referring now to FIGS. 13A and 13B, a method 800 for processing a received packet according to the present disclosure is shown. At 802, control receives a packet at a receiver, where the packet includes a first preamble followed by a second preamble, the first preamble is generated based on a first data rate, the second preamble is generated based on a second data rate, and at least one of the first preamble and the second preamble includes a duration of the packet.

At 804, control processes the first preamble if the receiver operates at the first data rate or the second preamble if the receiver operates at the second data rate, and control determines whether to defer accessing the medium for the duration of the packet based on the processing of the first preamble or the second preamble.

At 806, the first preamble includes a first training field to train receivers operating at the first data rate and a first signal field to indicate the duration of the packet, and control processes the first preamble if the receiver operates at the first data rate and trains on the first training field, and determines the duration of the packet based on the first signal field. Control detects an identifier in the first signal field and decides not to access the medium for the duration of the packet if the identifier indicates that the packet is not indented for the receiver.

At 808, the second preamble includes a second training field to train receivers operating at the second data rate and a second signal field to indicate the duration of the packet, and control processes the second preamble if the receiver operates at the second data rate and trains on the second training field, and determines the duration of the packet based on the second signal field. Control detects an identifier in the second signal field and decides not to access the medium for the duration of the packet if the identifier indicates that the packet is not indented for the receiver.

At 810, if the packet including data generated at the second rate and the receiver is configured to operate at the second rate, control processes the first preamble, and determines whether the packet includes data generated at the second rate based on the processing of the first preamble. Control processes the second preamble in response to determining that the packet includes data generated at the second rate, and determines the duration of the packet based on the processing of the second preamble. Control detects an identifier in the second preamble and decides not to access the medium for the duration of the packet if the identifier indicates that the packet is not indented for the receiver.

At 812, if the packet includes data generated at the first rate and the receiver is configured to operate at the first rate and the second rate, control processes the first preamble, determines whether the packet includes data generated at the second rate based on the processing of the first preamble. Control processes the second preamble in response to determining that the packet includes data generated at the second rate, and determines the duration of the packet based on the processing of the second preamble. Control detects an identifier in the second preamble and decides not to access the medium for the duration of the packet if the identifier indicates that the packet is not indented for the receiver.

Figure 14A:
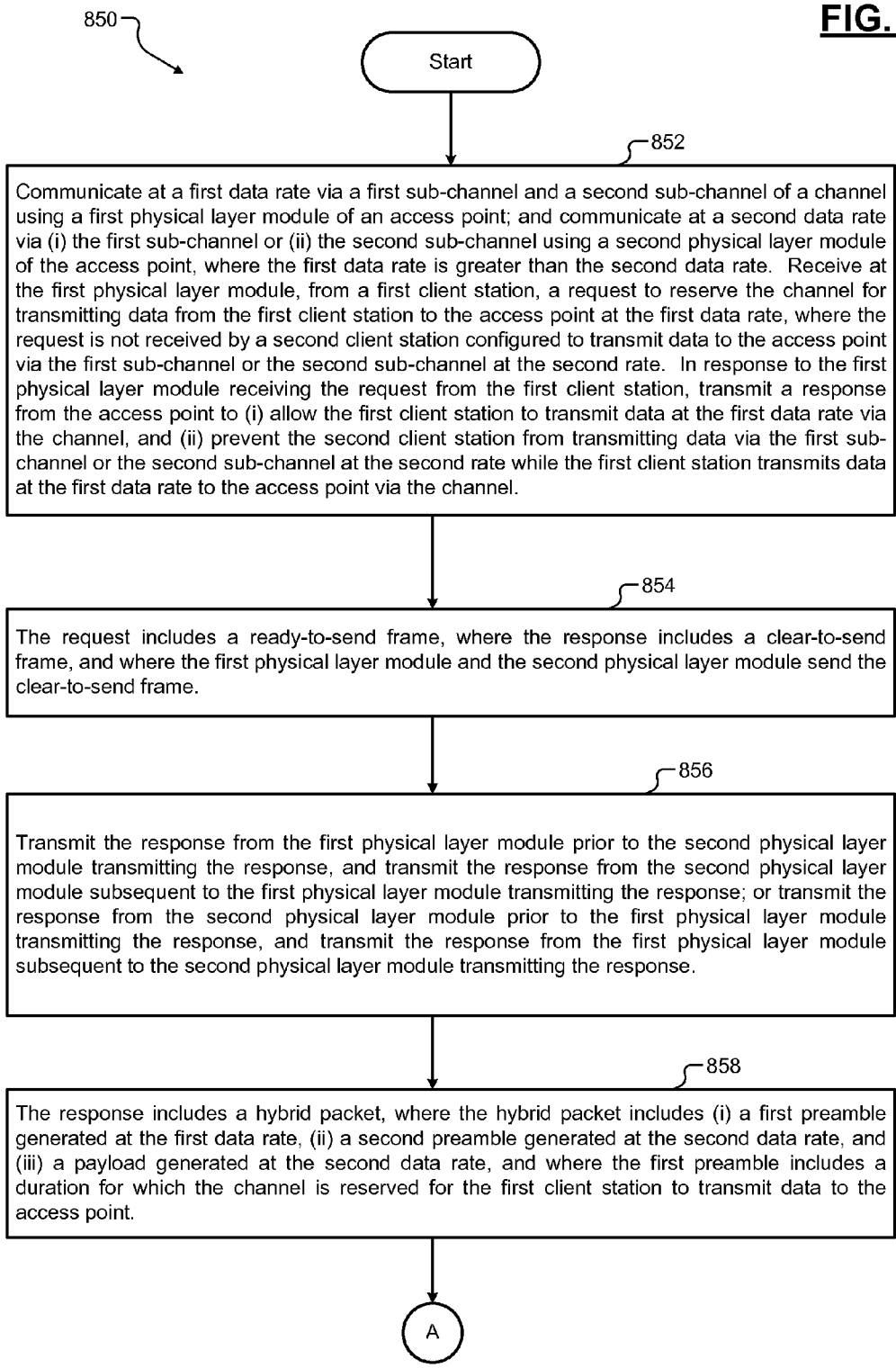
FIGS. 14A and 14B depict a flowchart for a method for solving the hidden terminal problem according to the present disclosure.
Figure 14B:
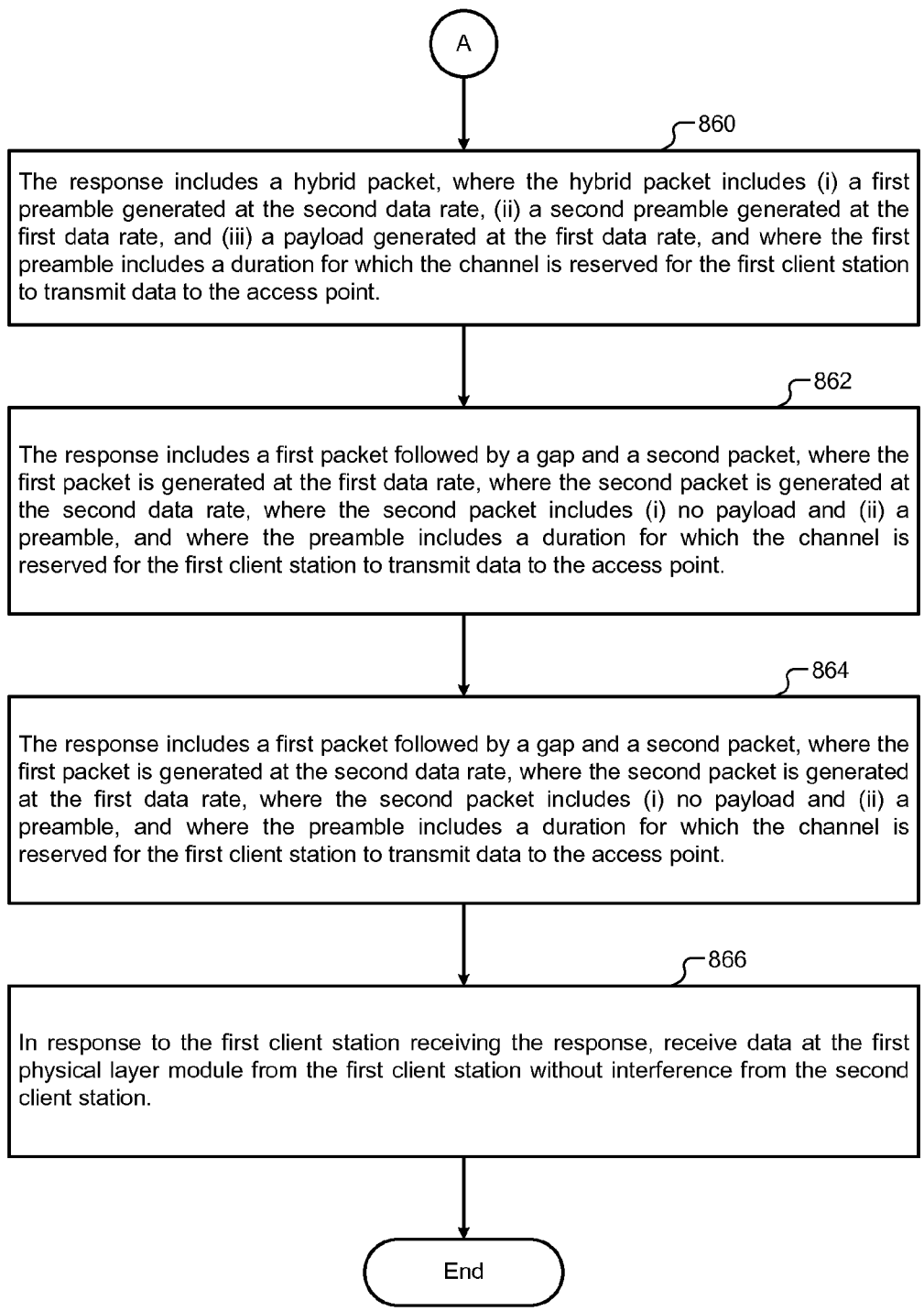

Referring now to FIGS. 14A and 14B, a method 850 for solving the hidden terminal problem according to the present disclosure is shown. At 852, control communicates at a first data rate via a first sub-channel and a second sub-channel of a channel using a first physical layer module of an access point. Control communicates at a second data rate via (i) the first sub-channel or (ii) the second sub-channel using a second physical layer module of the access point, where the first data rate is greater than the second data rate. Control receives at the first physical layer module, from a first client station, a request to reserve the channel for transmitting data from the first client station to the access point at the first data rate, where the request is not received by a second client station configured to transmit data to the access point via the first sub-channel or the second sub-channel at the second rate. In response to the first physical layer module receiving the request from the first client station, control transmits a response from the access point to (i) allow the first client station to transmit data at the first data rate via the channel, and (ii) prevent the second client station from transmitting data via the first sub-channel or the second sub-channel at the second rate while the first client station transmits data at the first data rate to the access point via the channel.

At 854, the request includes a ready-to-send frame, the response includes a clear-to-send frame, and control sends the clear-to-send frame via the first physical layer module and the second physical layer module.

At 856, control transmits the response from the first physical layer module prior to the second physical layer module transmitting the response, and control transmits the response from the second physical layer module subsequent to the first physical layer module transmitting the response; or control transmits the response from the second physical layer module prior to the first physical layer module transmitting the response, and control transmits the response from the first physical layer module subsequent to the second physical layer module transmitting the response.

At 858, the response includes a hybrid packet, where the hybrid packet includes (i) a first preamble generated at the first data rate, (ii) a second preamble generated at the second data rate, and (iii) a payload generated at the second data rate, and where the first preamble includes a duration for which the channel is reserved for the first client station to transmit data to the access point.

At 860, the response includes a hybrid packet, where the hybrid packet includes (i) a first preamble generated at the second data rate, (ii) a second preamble generated at the first data rate, and (iii) a payload generated at the first data rate, and where the first preamble includes a duration for which the channel is reserved for the first client station to transmit data to the access point.

At 862, the response includes a first packet followed by a gap and a second packet, where the first packet is generated at the first data rate, where the second packet is generated at the second data rate, where the second packet includes (i) no payload and (ii) a preamble, and where the preamble includes a duration for which the channel is reserved for the first client station to transmit data to the access point.

At 864, the response includes a first packet followed by a gap and a second packet, where the first packet is generated at the second data rate, where the second packet is generated at the first data rate, where the second packet includes (i) no payload and (ii) a preamble, and where the preamble includes a duration for which the channel is reserved for the first client station to transmit data to the access point.

At 866, in response to the first client station receiving the response, control receives data at the first physical layer module from the first client station without interference from the second client station.

Figure 15A:
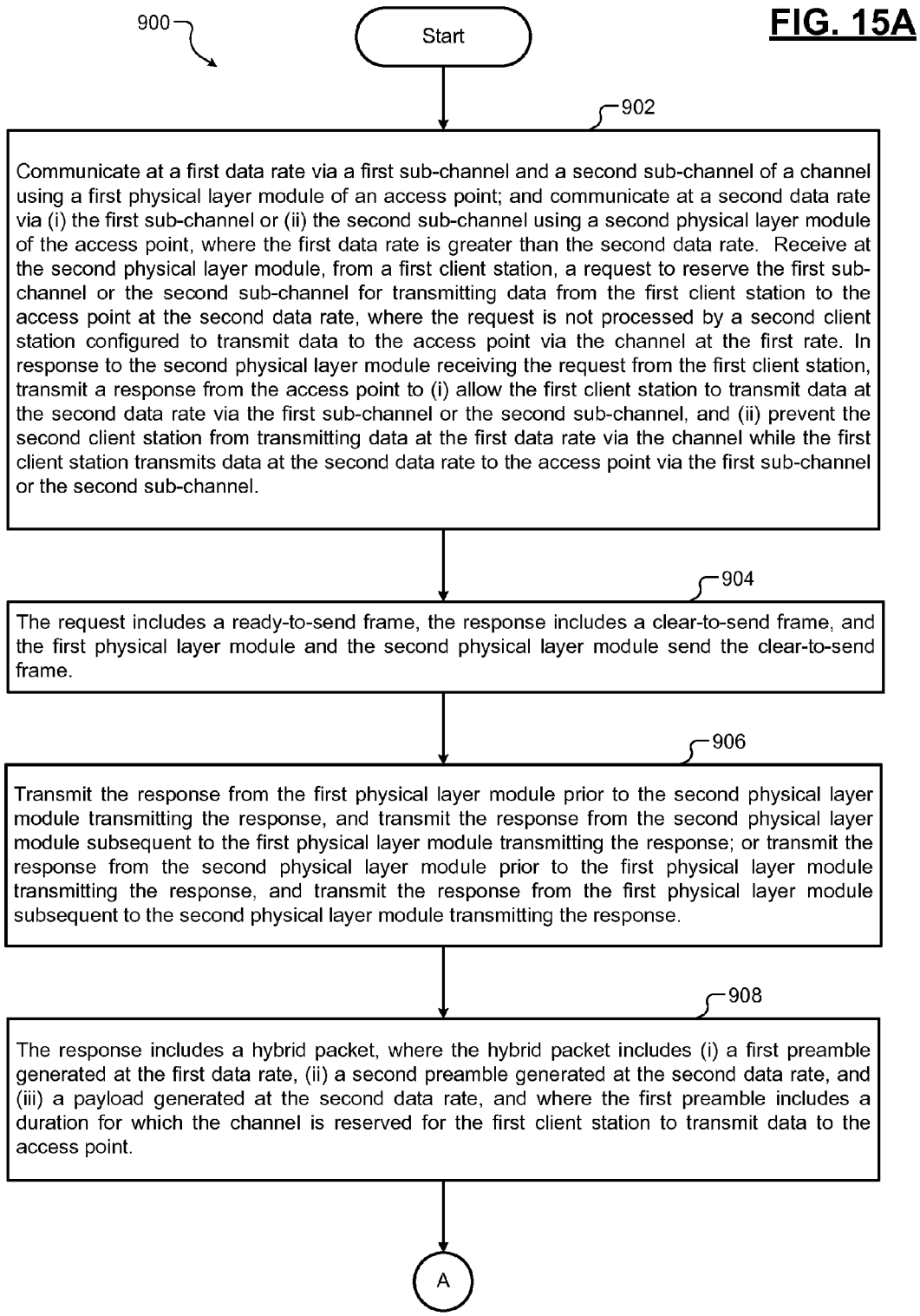
FIGS. 15A and 15B depict a flowchart for a method for solving the coexistence problems according to the present disclosure.
Figure 15B:
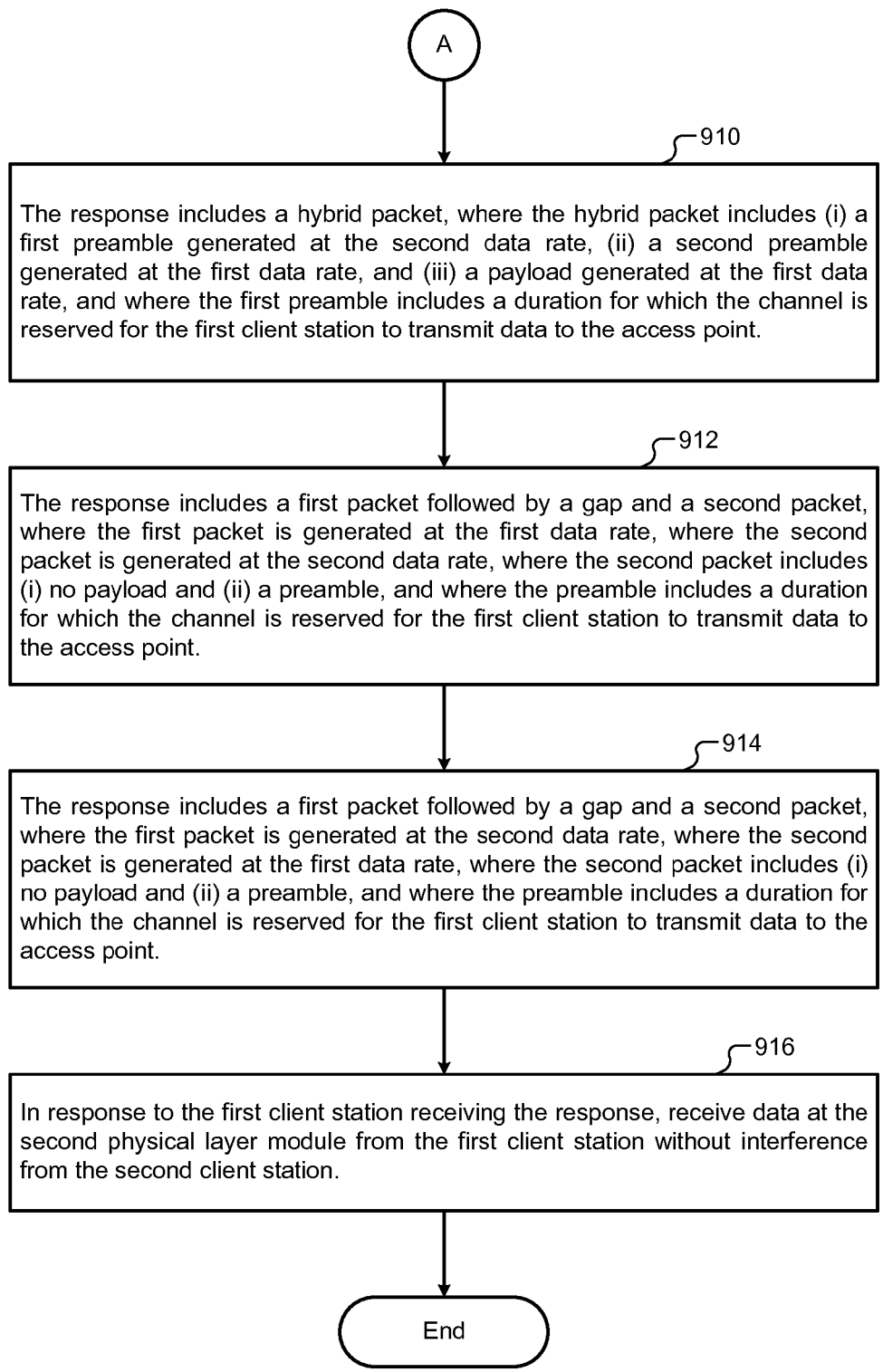

Referring now to FIGS. 15A and 15B, a method 900 for solving the coexistence problems according to the present disclosure is shown. At 902, control communicates at a first data rate via a first sub-channel and a second sub-channel of a channel using a first physical layer module of an access point. Control communicates at a second data rate via (i) the first sub-channel or (ii) the second sub-channel using a second physical layer module of the access point, where the first data rate is greater than the second data rate. Control receives at the second physical layer module, from a first client station, a request to reserve the first sub-channel or the second sub-channel for transmitting data from the first client station to the access point at the second data rate, where the request is not processed by a second client station configured to transmit data to the access point via the channel at the first rate. In response to the second physical layer module receiving the request from the first client station, control transmits a response from the access point to (i) allow the first client station to transmit data at the second data rate via the first sub-channel or the second sub-channel, and (ii) prevent the second client station from transmitting data at the first data rate via the channel while the first client station transmits data at the second data rate to the access point via the first sub-channel or the second sub-channel.

At 904, the request includes a ready-to-send frame, where the response includes a clear-to-send frame, and where the first physical layer module and the second physical layer module send the clear-to-send frame.

At 906, control transmits the response from the first physical layer module prior to the second physical layer module transmitting the response, and control transmits the response from the second physical layer module subsequent to the first physical layer module transmitting the response; or control transmits the response from the second physical layer module prior to the first physical layer module transmitting the response, and control transmits the response from the first physical layer module subsequent to the second physical layer module transmitting the response.

At 908, the response includes a hybrid packet, where the hybrid packet includes (i) a first preamble generated at the first data rate, (ii) a second preamble generated at the second data rate, and (iii) a payload generated at the second data rate, and where the first preamble includes a duration for which the channel is reserved for the first client station to transmit data to the access point.

At 910, the response includes a hybrid packet, where the hybrid packet includes (i) a first preamble generated at the second data rate, (ii) a second preamble generated at the first data rate, and (iii) a payload generated at the first data rate, and where the first preamble includes a duration for which the channel is reserved for the first client station to transmit data to the access point.

At 912, the response includes a first packet followed by a gap and a second packet, where the first packet is generated at the first data rate, where the second packet is generated at the second data rate, where the second packet includes (i) no payload and (ii) a preamble, and where the preamble includes a duration for which the channel is reserved for the first client station to transmit data to the access point.

At 914, the response includes a first packet followed by a gap and a second packet, where the first packet is generated at the second data rate, where the second packet is generated at the first data rate, where the second packet includes (i) no payload and (ii) a preamble, and where the preamble includes a duration for which the channel is reserved for the first client station to transmit data to the access point.

At 916, in response to the first client station receiving the response, control receives data at the second physical layer module from the first client station without interference from the second client station.

Figure 16:
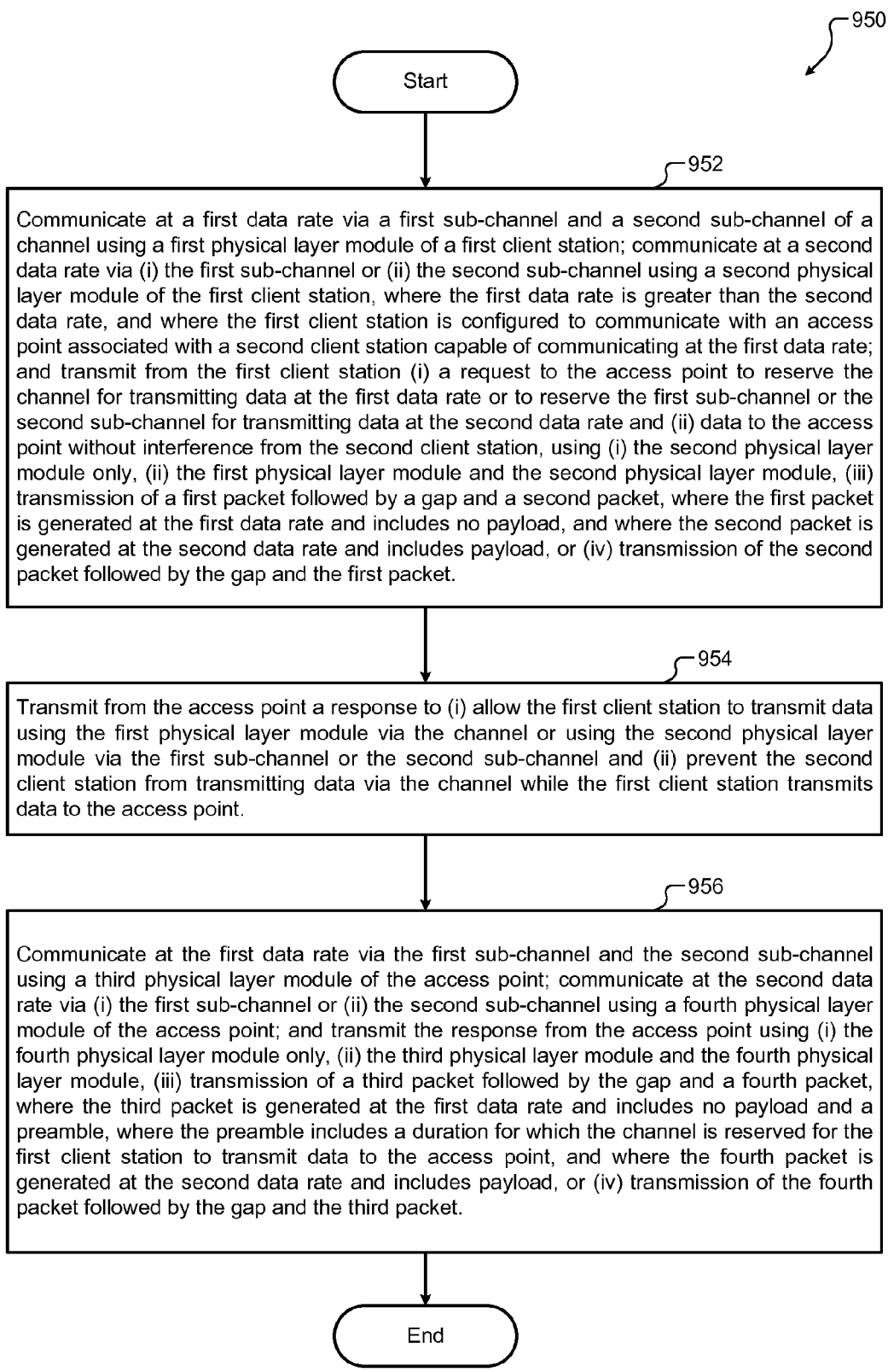
FIG. 16 depicts a flowchart of a method for solving the coexistence problem according to the present disclosure.

Referring now to FIG. 16, a method 950 for solving the coexistence problem according to the present disclosure is shown. At 952, control communicates at a first data rate via a first sub-channel and a second sub-channel of a channel using a first physical layer module of a first client station. Control communicates at a second data rate via (i) the first sub-channel or (ii) the second sub-channel using a second physical layer module of the first client station, where the first data rate is greater than the second data rate, and where the first client station is configured to communicate with an access point associated with a second client station capable of communicating at the first data rate. Control transmits from the first client station (i) a request to the access point to reserve the channel for transmitting data at the first data rate or to reserve the first sub-channel or the second sub-channel for transmitting data at the second data rate and (ii) data to the access point without interference from the second client station, using (i) the second physical layer module only, (ii) the first physical layer module and the second physical layer module, (iii) transmission of a first packet followed by a gap and a second packet, where the first packet is generated at the first data rate and includes no payload, and where the second packet is generated at the second data rate and includes payload, or (iv) transmission of the second packet followed by the gap and the first packet.

At 954, control transmits from the access point a response to (i) allow the first client station to transmit data using the first physical layer module via the channel or using the second physical layer module via the first sub-channel or the second sub-channel and (ii) prevent the second client station from transmitting data via the channel while the first client station transmits data to the access point.

At 956, control communicates at the first data rate via the first sub-channel and the second sub-channel using a third physical layer module of the access point. Control communicates at the second data rate via (i) the first sub-channel or (ii) the second sub-channel using a fourth physical layer module of the access point. Control transmits the response from the access point using (i) the fourth physical layer module only, (ii) the third physical layer module and the fourth physical layer module, (iii) transmission of a third packet followed by the gap and a fourth packet, where the third packet is generated at the first data rate and includes no payload and a preamble, where the preamble includes a duration for which the channel is reserved for the first client station to transmit data to the access point, and where the fourth packet is generated at the second data rate and includes payload, or (iv) transmission of the fourth packet followed by the gap and the third packet.

Figure 17A:
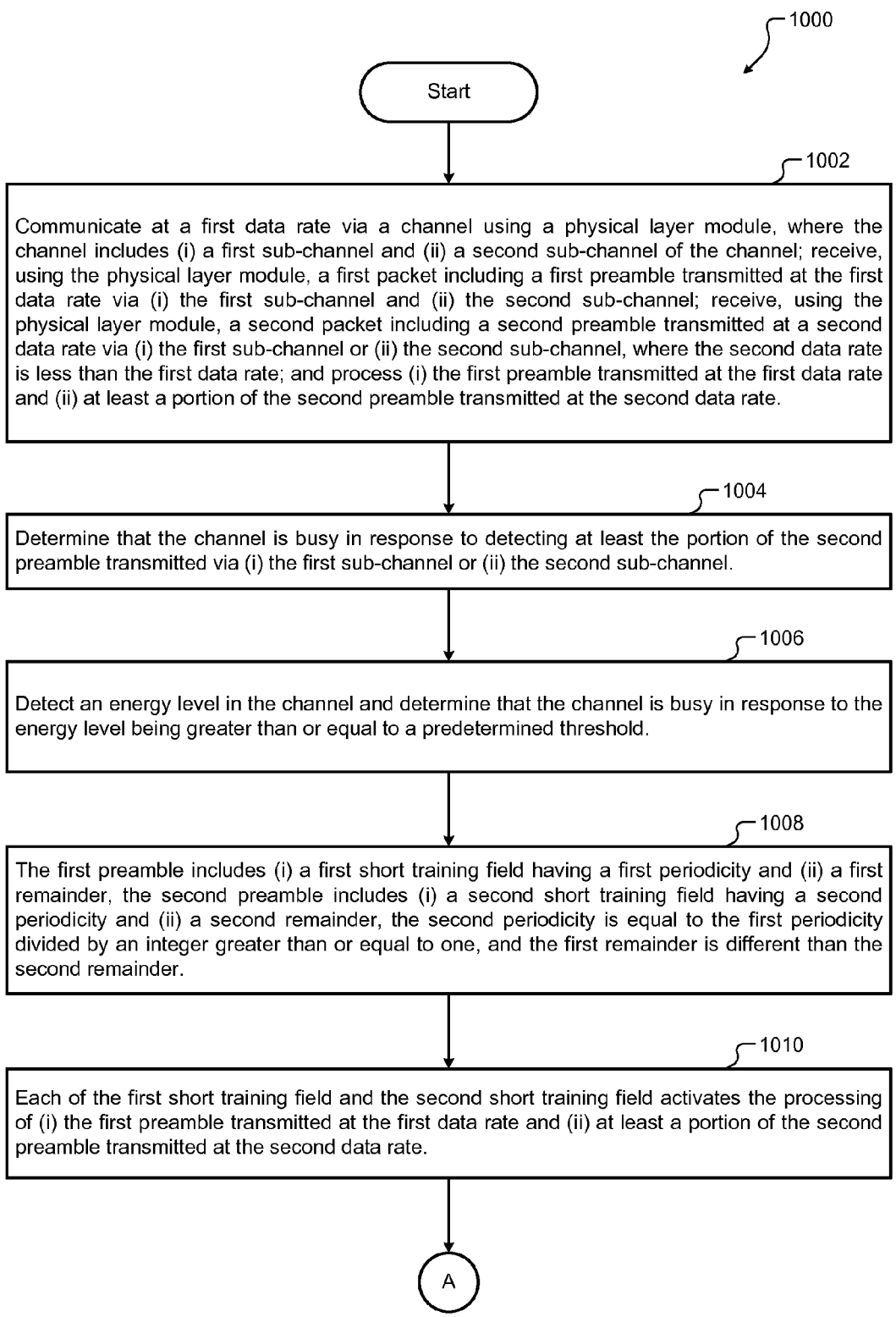
FIGS. 17A-17C depict a flowchart of a method for coexistence of devices having varying capabilities according to the present disclosure.
Figure 17B:
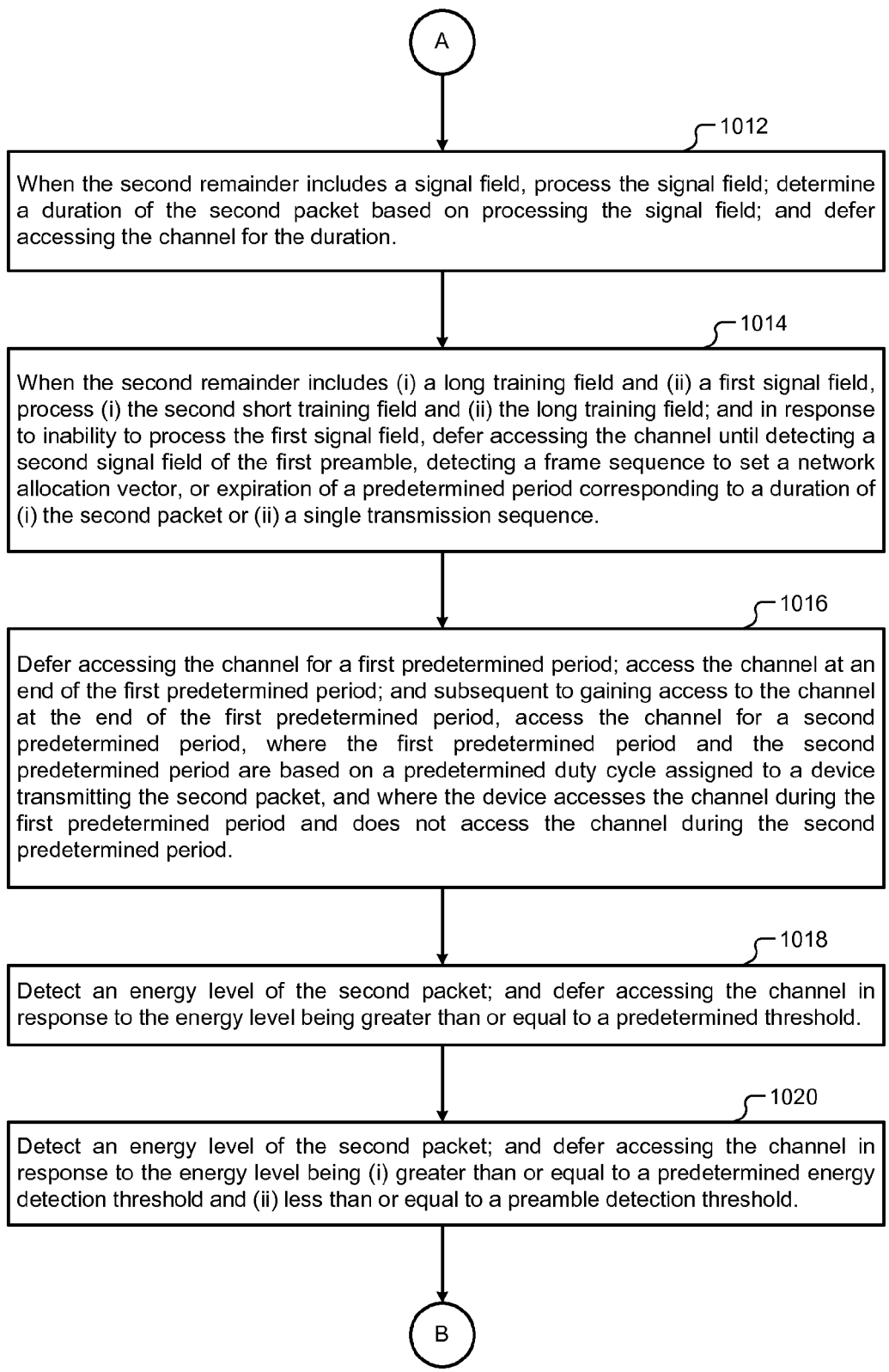
Figure 17C:
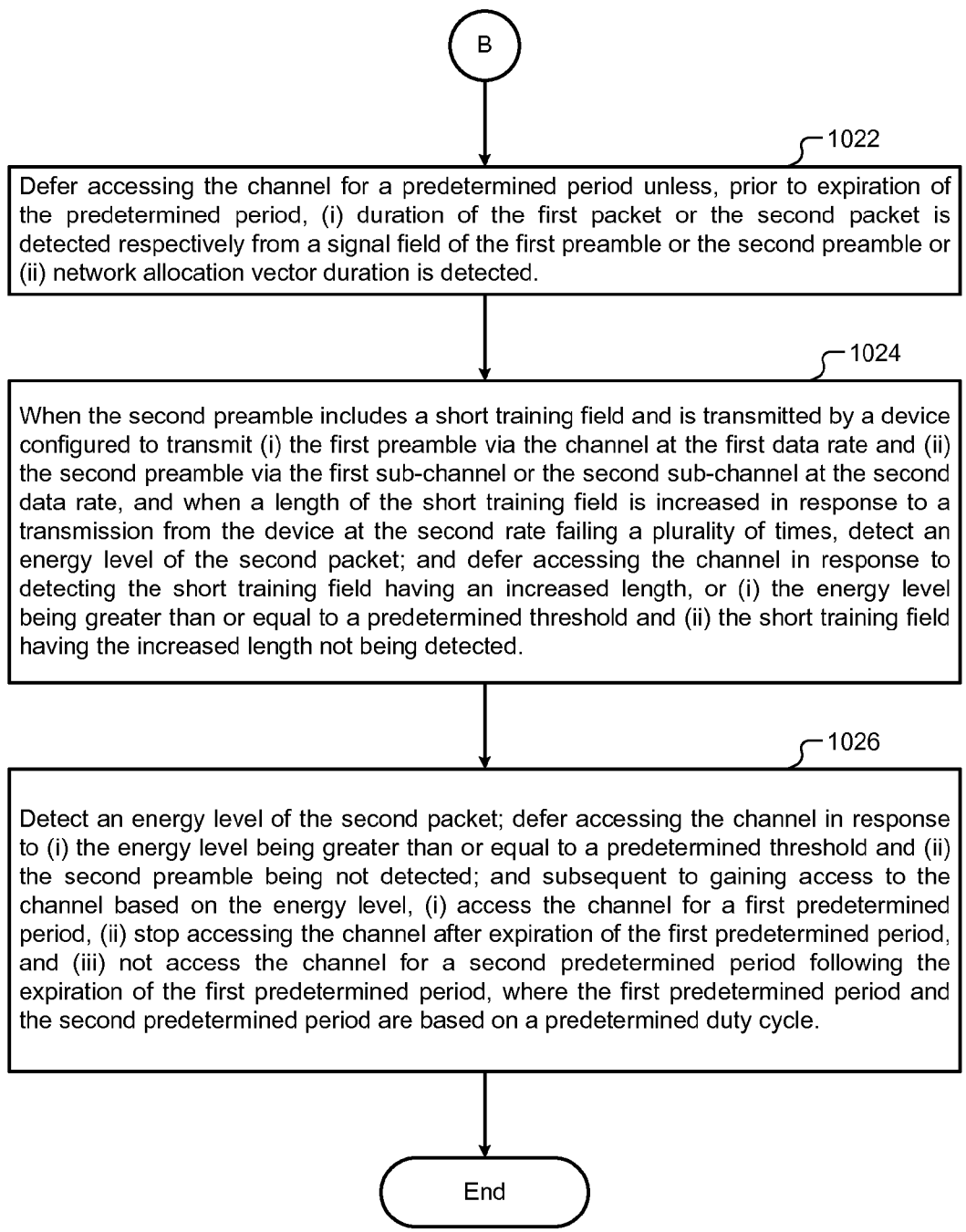

Referring now to FIGS. 17A-17C, a method 1000 for coexistence of devices having varying capabilities according to the present disclosure is shown. At 1002, control communicates at a first data rate via a channel using a physical layer module, where the channel includes (i) a first sub-channel and (ii) a second sub-channel of the channel. Control receives, using the physical layer module, a first packet including a first preamble transmitted at the first data rate via (i) the first sub-channel and (ii) the second sub-channel. Control receives, using the physical layer module, a second packet including a second preamble transmitted at a second data rate via (i) the first sub-channel or (ii) the second sub-channel, where the second data rate is less than the first data rate. Control processes (i) the first preamble transmitted at the first data rate and (ii) at least a portion of the second preamble transmitted at the second data rate.

At 1004, control determines that the channel is busy in response to detecting at least the portion of the second preamble transmitted via (i) the first sub-channel or (ii) the second sub-channel.

At 1006, control detects an energy level in the channel and determines that the channel is busy in response to the energy level being greater than or equal to a predetermined threshold.

At 1008, the first preamble includes (i) a first short training field having a first periodicity and (ii) a first remainder, the second preamble includes (i) a second short training field having a second periodicity and (ii) a second remainder, the second periodicity is equal to the first periodicity divided by an integer greater than or equal to one, and the first remainder is different than the second remainder.

At 1010, each of the first short training field and the second short training field activates the processing of (i) the first preamble transmitted at the first data rate and (ii) at least a portion of the second preamble transmitted at the second data rate.

At 1012, the second remainder includes a signal field, and control processes the signal field; determines a duration of the second packet based on processing the signal field; and defers accessing the channel for the duration.

At 1014, the second remainder includes (i) a long training field and (ii) a first signal field, and control processes (i) the second short training field and (ii) the long training field. In response to inability to process the first signal field, control defers accessing the channel until (i) detecting a second signal field of the first preamble, (ii) detecting a frame sequence to set a network allocation vector, or (iii) expiration of a predetermined period corresponding to a duration of the second packet or a single transmission sequence.

At 1016, control defers accessing the channel for a first predetermined period, accesses the channel at an end of the first predetermined period, and subsequent to gaining access to the channel at the end of the first predetermined period, accesses the channel for a second predetermined period. The first predetermined period and the second predetermined period are based on a predetermined duty cycle assigned to a device transmitting the second packet. The device accesses the channel during the first predetermined period and does not access the channel during the second predetermined period.

At 1018, control detects an energy level of the second packet, and defers accessing the channel in response to the energy level being greater than or equal to a predetermined threshold.

At 1020, control detects an energy level of the second packet, and defers accessing the channel in response to the energy level being (i) greater than or equal to a predetermined energy detection threshold and (ii) less than or equal to a preamble detection threshold.

At 1022, control defers accessing the channel for a predetermined period unless, prior to expiration of the predetermined period, (i) duration of the first packet or the second packet is detected respectively from a signal field of the first preamble or the second preamble or (ii) network allocation vector duration is detected.

At 1024, the second preamble includes a short training field and is transmitted by a device configured to transmit (i) the first preamble via the channel at the first data rate and (ii) the second preamble via the first sub-channel or the second sub-channel at the second data rate, and a length of the short training field is increased in response to a transmission from the device at the second rate failing a plurality of times. Control detects an energy level of the second packet, and defers accessing the channel in response to detecting the short training field having an increased length, or (i) the energy level being greater than or equal to a predetermined threshold and (ii) the short training field having the increased length not being detected.

At 1026, control detects an energy level of the second packet, defers accessing the channel in response to (i) the energy level being greater than or equal to a predetermined threshold and (ii) the second preamble being not detected, and subsequent to gaining access to the channel based on the energy level, (i) accesses the channel for a first predetermined period, (ii) stops accessing the channel after expiration of the first predetermined period, and (iii) does not access the channel for a second predetermined period following the expiration of the first predetermined period. The first predetermined period and the second predetermined period are based on a predetermined duty cycle.

Referring now to FIG. 18, a method 1050 for coexistence of a normal-rate physical layer and a low-rate physical layer in a wireless network using midambles according to the present disclosure is shown. At 1052, control detects a midamble of a packet transmitted via a channel, where the packet includes (i) a preamble, (ii) the midamble, and (iii) a plurality of data fields, where the preamble includes (i) a first short training field, (ii) a first long training field, and (iii) a signal field, where the midamble includes (i) a second short training field and (ii) a second long training field, and where the midamble follows the preamble and is between two or more of the data fields. Control determines that the channel is busy in response to detecting the midamble in the packet.

At 1054, in response to the midamble being present in the packet following every predetermined number of data symbols, control operates a client station in a power save mode for a duration of (i) the predetermined number of data symbols or (ii) a multiple of the predetermined number of data symbols; wakes up the client station following the duration; and determines, subsequent to the client station waking up, that the channel is busy in response to detecting the midamble in the packet.

At 1056, in response the midamble not being detected in the packet, control determines whether the channel is busy in response to detecting the preamble.

At 1058, control communicates at a first data rate via (i) a first sub-channel or (ii) a second sub-channel of the channel using a physical layer module; detects the midamble in (i) the first sub-channel or (ii) the second sub-channel in response to the midamble being transmitted at a second data rate via (i) the first sub-channel and (ii) the second sub-channel, where the second data rate is greater than the first data rate; and determines, in response to the midamble being detected in (i) the first sub-channel or (ii) the second sub-channel, that a transmission at the second data rate is ongoing in the channel, and deciding not to access the channel.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An access point comprising:
a transceiver including
a first physical layer configured to communicate at a first data rate via a first sub-channel and a second sub-channel of a channel; and
a second physical layer configured to communicate at a second data rate via the first sub-channel or the second sub-channel of the channel, wherein the first data rate is greater than the second data rate,
wherein the transceiver is configured to receive, from a first client station, a request to reserve (i) the first sub-channel, (ii) the second sub-channel, or (iii) the channel for transmitting data from the first client station to the access point at the first data rate or the second data rate,
wherein in response to receiving the request from the first client station, the transceiver is configured to transmit a response to (i) allow the first client station to transmit data to the access point, and (ii) prevent a second client station from transmitting data to the access point while the first client station transmits data to the access point, and
wherein in response to the first client station receiving the response, the first physical layer is configured to receive data from the first client station without interference from the second client station.

2. The access point of claim 1, wherein:
the first physical layer is configured to receive, from the first client station, the request to reserve the channel for transmitting data from the first client station to the access point at the first data rate;
the request is not received by the second client station configured to transmit data to the access point via the first sub-channel or the second sub-channel at the second data rate; and
in response to the first physical layer receiving the request from the first client station, the transceiver is configured to transmit the response to (i) allow the first client station to transmit data at the first data rate via the channel, and (ii) prevent the second client station from transmitting data via the first sub-channel or the second sub-channel at the second rate while the first client station transmits data at the first data rate to the access point via the channel.

3. The access point of claim 1, wherein:
the second physical layer is configured to receive, from the first client station, the request to reserve the first sub-channel or the second sub-channel for transmitting data from the first client station to the access point at the second data rate;
the request is not processed by the second client station configured to transmit data to the access point via the channel at the first rate; and
in response to the second physical layer receiving the request from the first client station, the transceiver is configured to transmit the response to (i) allow the first client station to transmit data at the second data rate via the first sub-channel or the second sub-channel, and (ii) prevent the second client station from transmitting data at the first data rate via the channel while the first client station transmits data at the second data rate to the access point via the first sub-channel or the second sub-channel.

4. The access point of claim 1, wherein the request is (i) not received or (ii) not processed by a second client station configured to transmit data to the access point via (i) the first sub-channel, (ii) the second sub-channel, or (iii) the channel at a different data rate than the first client station.

5. The access point of claim 1, wherein:
the request includes a ready-to-send frame;
the response includes a clear-to-send frame; and
the transceiver is configured to transmit the clear-to-send frame via the first physical layer and the second physical layer.

6. The access point of claim 1, wherein:
the first physical layer is configured to transmit the response prior to the second physical layer transmitting the response; and
the second physical layer is configured to transmit the response subsequent to the first physical layer transmitting the response.

7. The access point of claim 1, wherein:
the second physical layer is configured to transmit the response prior to the first physical layer transmitting the response; and
the first physical layer is configured to transmit the response subsequent to the second physical layer transmitting the response.

8. The access point of claim 1, wherein:
the response includes a hybrid packet;
the hybrid packet includes (i) a first preamble generated at the first data rate, (ii) a second preamble generated at the second data rate, and (iii) a payload generated at the second data rate; and
the first preamble includes a duration for which the channel is reserved for the first client station to transmit data to the access point.

9. The access point of claim 1, wherein:
the response includes a hybrid packet;
the hybrid packet includes (i) a first preamble generated at the second data rate, (ii) a second preamble generated at the first data rate, and (iii) a payload generated at the first data rate; and
the first preamble includes a duration for which the channel is reserved for the first client station to transmit data to the access point.

10. The access point of claim 1, wherein:
the response includes a first packet followed by a gap and a second packet;
the first packet is generated at the first data rate;
the second packet is generated at the second data rate;
the second packet includes (i) no payload and (ii) a preamble; and
the preamble includes a duration for which the channel is reserved for the first client station to transmit data to the access point.

11. The access point of claim 1, wherein:
the response includes a first packet followed by a gap and a second packet;
the first packet is generated at the second data rate;
the second packet is generated at the first data rate;
the second packet includes (i) no payload and (ii) a preamble; and
the preamble includes a duration for which the channel is reserved for the first client station to transmit data to the access point.

12. A method comprising:
communicating, via a first physical layer of a transceiver of an access point, at a first data rate via a first sub-channel and a second sub-channel of a channel;
communicating, via a second physical layer of the transceiver of the access point, at a second data rate via the first sub-channel or the second sub-channel of the channel, wherein the first data rate is greater than the second data rate;
receiving, at the transceiver, from a first client station, a request to reserve (i) the first sub-channel, (ii) the second sub-channel, or (iii) the channel for transmitting data from the first client station to the access point at the first data rate or the second data rate;
transmitting, from the transceiver, in response to receiving the request from the first client station, a response to (i) allow the first client station to transmit data to the access point, and (ii) prevent a second client station from transmitting data to the access point while the first client station transmits data to the access point; and
receiving, at the first physical layer, in response to the first client station receiving the response, data from the first client station without interference from the second client station.

13. The method of claim 12, wherein:
receiving, at the first physical layer, from the first client station, the request to reserve the channel for transmitting data from the first client station to the access point at the first data rate; wherein the request is not received by the second client station configured to transmit data to the access point via the first sub-channel or the second sub-channel at the second data rate; and
transmitting, from the transceiver, in response to the first physical layer receiving the request from the first client station, the response to (i) allow the first client station to transmit data at the first data rate via the channel, and (ii) prevent the second client station from transmitting data via the first sub-channel or the second sub-channel at the second rate while the first client station transmits data at the first data rate to the access point via the channel.

14. The method of claim 12, wherein:
receiving, at the second physical layer, from the first client station, the request to reserve the first sub-channel or the second sub-channel for transmitting data from the first client station to the access point at the second data rate; wherein the request is not processed by the second client station configured to transmit data to the access point via the channel at the first rate; and
transmitting, from the transceiver, in response to the second physical layer receiving the request from the first client station, the response to (i) allow the first client station to transmit data at the second data rate via the first sub-channel or the second sub-channel, and (ii) prevent the second client station from transmitting data at the first data rate via the channel while the first client station transmits data at the second data rate to the access point via the first sub-channel or the second sub-channel.

15. The method of claim 12, wherein the request is (i) not received or (ii) not processed by a second client station configured to transmit data to the access point via (i) the first sub-channel, (ii) the second sub-channel, or (iii) the channel at a different data rate than the first client station.

16. The method of claim 12, wherein:
the request includes a ready-to-send frame;
the response includes a clear-to-send frame; and
transmitting the response from the transceiver includes transmitting the clear-to-send frame via the first physical layer and the second physical layer.

17. The method of claim 12, wherein transmitting the response from the transceiver includes:
transmitting the response from the first physical layer prior to the second physical layer transmitting the response; and
transmitting the response from the second physical layer subsequent to the first physical layer transmitting the response.

18. The method of claim 12, wherein transmitting the response from the transceiver includes:
transmitting the response from the second physical layer prior to the first physical layer transmitting the response; and
transmitting the response from the first physical layer subsequent to the second physical layer transmitting the response.

19. The method of claim 12, wherein transmitting the response from the transceiver includes:
generating a first preamble at the first data rate;
including, in the first preamble, a duration for which the channel is reserved for the first client station to transmit data to the access point;
generating a second preamble at the second data rate;
generating a payload at the second data rate;
generating a hybrid packet including (i) the first preamble, (ii) the second preamble, and (iii) the payload; and
transmitting the hybrid packet.

20. The method of claim 12, wherein transmitting the response from the transceiver includes:
generating a first preamble at the second data rate;
including, in the first preamble, a duration for which the channel is reserved for the first client station to transmit data to the access point;
generating a second preamble at the first data rate;
generating a payload at the first data rate;
generating a hybrid packet including (i) the first preamble, (ii) the second preamble, and (iii) the payload; and
transmitting the hybrid packet.

21. The method of claim 12, wherein transmitting the response from the transceiver includes:
generating a first packet at the first data rate;
generating a second packet at the second data rate, wherein the second packet includes (i) no payload and (ii) a preamble;
including, in the preamble, a duration for which the channel is reserved for the first client station to transmit data to the access point; and
transmitting the first packet followed by a gap and the second packet.

22. The method of claim 12, wherein:
generating a first packet at the second data rate;
generating a second packet at the first data rate, wherein the second packet includes (i) no payload and (ii) a preamble;
including, in the preamble, a duration for which the channel is reserved for the first client station to transmit data to the access point; and
transmitting the first packet followed by a gap and the second packet.

* * * * *